(12) United States Patent
Kyung et al.

(10) Patent No.: US 11,165,984 B2
(45) Date of Patent: Nov. 2, 2021

(54) CAMERA SYSTEM WITH COMPLEMENTARY PIXLET STRUCTURE

(71) Applicant: Dexelion Inc., Daejeon (KR)

(72) Inventors: Chong Min Kyung, Daejeon (KR); Hyun Sang Park, Cheonan-si (KR); Seung Hyuk Chang, Seoul (KR); Jong Ho Park, Seoul (KR); Sang Jin Lee, Daejeon (KR)

(73) Assignee: Dexelion Inc., Daejeon (KR)

( * ) Notice: Subject to any disclaimer, the term of this patent is extended or adjusted under 35 U.S.C. 154(b) by 0 days.

(21) Appl. No.: 17/088,893

(22) Filed: Nov. 4, 2020

(65) Prior Publication Data

US 2021/0281790 A1 Sep. 9, 2021

(30) Foreign Application Priority Data

Mar. 6, 2020 (KR) .................. 10-2020-0028162

(51) Int. Cl.
*H04N 5/225* (2006.01)
*H04N 5/369* (2011.01)
*H04N 5/3745* (2011.01)

(52) U.S. Cl.
CPC ......... *H04N 5/379* (2018.08); *H04N 5/36965* (2018.08); *H04N 5/3745* (2013.01)

(58) Field of Classification Search
None
See application file for complete search history.

(56) References Cited

U.S. PATENT DOCUMENTS

| | | | | |
|---|---|---|---|---|
| 2003/0086008 A1* | 5/2003 | Nagano | ................ | H04N 5/3696 348/272 |
| 2008/0180554 A1* | 7/2008 | Kobayashi | ............. | H04N 5/367 348/246 |
| 2010/0141812 A1* | 6/2010 | Hirota | ...................... | G02B 5/20 348/279 |
| 2013/0329095 A1* | 12/2013 | Aoki | .................. | H04N 5/23212 348/241 |

FOREIGN PATENT DOCUMENTS

KR 10-2016-0100569 8/2016
KR 10-2019-0105357 2/2020

* cited by examiner

*Primary Examiner* — Twyler L Haskins
*Assistant Examiner* — Dwight Alex C Tejano
(74) *Attorney, Agent, or Firm* — Nixon Peabody LLP

(57) ABSTRACT

A camera system with a complementary pixlet structure and a method of operating the same are provided. The camera system includes an image sensor that includes at least one 2×2 pixel block including a first pixel, a second pixel, and two third pixels—the two third pixels are disposed at positions diagonal to each other in the 2×2 pixel block and include deflected small pixlets, which are deflected in opposite directions to be symmetrical to each other with respect to each pixel center, and large pixlets adjacent to the deflected small pixlets, respectively, and each pixlet includes an photodiode converting an optical signal to an electrical signal and a depth calculator that receives images acquired from the deflected small pixlets of the two third pixels and calculates a depth between the image sensor and an object using a parallax between the images.

6 Claims, 15 Drawing Sheets

CAMERA SYSTEM WITH COMPLEMENTARY PIXLET STRUCTURE

CROSS-REFERENCE TO RELATED APPLICATIONS

A claim for priority under 35 U.S.C. § 119 is made to Korean Patent Application No 10-2020-0028162 filed on Mar. 6, 2020, in the Korean Intellectual Property Office, the entire contents of which are hereby incorporated by reference.

BACKGROUND

Embodiments of the inventive concept described herein relate to a camera system, and more particularly, relate to a camera system including an image sensor having a complementary pixlet structure.

An existing camera system includes an image sensor having one photodiode disposed within one pixel below a microlens to obtain a general image by processing light rays having at least one wavelength but not to perform an additional application function-estimation of a depth to an object.

Therefore, for performing the above-described application function in the existing camera system, two or more cameras are provided in the camera system and utilized or an additional aperture distinguished from a basic aperture has to be provided in the camera system including a single camera.

Accordingly, the following embodiments provide a camera system with a complementary pixlet structure including an image sensor, in which two photodiodes (hereinafter, a term "pixlet" is used as a component corresponding to each of the two photodiodes included in one pixel) are implemented in one pixel, thereby suggesting a technique capable of estimating a depth to an object in a single camera system.

SUMMARY

Embodiments of the inventive concept provide an image sensor with a complementary pixlet structure, in which two pixlets are implemented in one pixel, to enable estimation of a depth to an object in a single camera system.

According to an aspect, embodiments provide a structure in which a deflected small pixlet in each of pixels included in one 2×2 pixel block is formed to calculate a depth between an image sensor and an object using a parallax between images obtained through the deflected small pixlets of the pixels in the one 2×2 pixel block.

According to another aspect, embodiments provide a structure in which a pixel in which a deflected small pixlet is formed is included in each of two 2×2 pixel blocks to calculate a depth between an image sensor and an object using a parallax between images obtained through the deflected small pixlets of the pixels in the two 2×2 pixel blocks.

According to another aspect, embodiments provide a structure in which a deflected small pixlet is formed in each of first pixels included in one 2×2 pixel block and a deflected small pixlet is formed in each second pixel of two 2×2 pixel blocks to calculate a depth between an image sensor and an object using a parallax between images acquired through the deflected small pixlets of the first pixels in the one 2×2 pixel block or a parallax between images acquired through the deflected small pixlets of the second pixels in the two 2×2 pixel blocks.

Embodiments provide a camera system regularly using pixlets for calculating a depth within two pixels to simplify a depth calculating algorithm and reduce work complexity, to reduce depth calculation time consumption and secure real-time, to simplify circuit configuration, and to ensure consistent depth resolution.

Here, embodiments provide a camera system configured to process white "W" optical signals in deflected small pixlets for depth calculation, thereby maximizing a parallax between images obtained from the deflected small pixlets.

In addition, embodiments provide a camera system in which a 2×2 pixel block is configured to include a red "R" pixel, a yellow "Y" pixel, and a white "W" pixel or a green "G" pixel, a "Y" pixel, and a "W" pixel, thereby securing color restoration and signal-to-noise ratio (SNR).

According to an exemplary embodiment, a camera system with a complementary pixlet structure includes an image sensor that includes at least one 2×2 pixel block including a first pixel, a second pixel, and two third pixels—the two third pixels are disposed at positions diagonal to each other in the 2×2 pixel block and include deflected small pixlets, which are deflected in opposite directions to be symmetrical to each other with respect to each pixel center, and large pixlets adjacent to the deflected small pixlets, respectively, and each pixlet includes an photodiode converting an optical signal to an electrical signal and a depth calculator that receives images acquired from the deflected small pixlets of the two third pixels and calculates a depth between the image sensor and an object using a parallax between the images.

According to an exemplary embodiment, a method of operating a camera system with an image sensor having a complementary pixlet structure, which includes at least one 2×2 pixel block including a first pixel, a second pixel, and two third pixels, and a depth calculator, includes introducing optical signals into the two third pixels, respectively—the two third pixels are disposed at positions diagonal to each other in the 2×2 pixel block and include deflected small pixlets, which are deflected in opposite directions to be symmetrical to each other with respect to each pixel center, and large pixlets adjacent to the deflected small pixlets, respectively, and each pixlet includes a photodiode converting an optical signal to an electrical signal, processing the optical signals through the deflected small pixlets of the two third pixels in the image sensor to obtain images, and calculating a depth between the image sensor and an object using a parallax between the images input from the image sensor, in the depth calculator.

According to an exemplary embodiment, a camera system with a complementary pixlet structure includes an image sensor that includes a first 2×2 pixel block including a first pixel, a second pixel, a third pixel, and a fourth pixel, and a second 2×2 pixel block including the first pixel, the second pixel, the third pixel, and a fifth pixel—the fourth pixel and the fifth pixel are disposed at positions corresponding to each other and include deflected small pixlets, which are deflected in opposite directions to be symmetrical to each other with respect to each pixel center, and large pixlets adjacent to the deflected small pixlets, respectively, and each pixlet includes an photodiode converting an optical signal to an electrical signal and a depth calculator that receives images acquired from the deflected small pixlets of the fourth pixel and the fifth pixel and calculates a depth between the image sensor and an object using a parallax between the images.

According to an exemplary embodiment, a method of operating a camera system with a complementary pixlet structure comprising an image sensor, which includes a first 2×2 pixel block including a first pixel, a second pixel, a third pixel, and a fourth pixel, and a second 2×2 pixel block including the first pixel, the second pixel, the third pixel, and a fifth pixel, and a depth calculator, includes introducing optical signals into the fourth pixel and the fifth pixel, respectively—the fourth pixel and the fifth pixel are disposed at positions corresponding to each other and include deflected small pixlets, which are deflected in opposite directions to be symmetrical to each other with respect to each pixel center, and large pixlets adjacent to the deflected small pixlets, respectively, and each pixlet includes an photodiode converting an optical signal to an electrical signal, processing the optical signals through the deflected small pixlets of the fourth pixel and the fifth pixel in the image sensor to obtain images, and calculating a depth between the image sensor and an object using a parallax between the images input from the image sensor, in the depth calculator.

According to an exemplary embodiment, a camera system with a complementary pixlet structure includes an image sensor that includes a first 2×2 pixel block including a first pixel, a second pixel, and two third pixels, and a second 2×2 pixel block including a fourth pixel, a fifth pixel, the two third pixels—the two third pixels are disposed at positions diagonal to each other in a 2×2 pixel block and include deflected small pixlets deflected in opposite directions to be symmetrical to each other with respect to each pixel center, the first pixel and the fourth pixel are disposed at the same position within the 2×2 pixel block and include deflected small pixlets deflected in opposite directions to be symmetrical to each other with respect to each pixel center, the second pixel and fifth pixel are disposed at the same position within the 2×2 pixel block and include deflected small pixlets deflected in opposite directions to be symmetrical to each other with respect to each pixel center, and each pixlet includes an photodiode converting an optical signal to an electrical signal, and a depth calculator that receives one set of a set of images acquired from the deflected small pixlets of the two third pixels, a set of images acquired from the deflected small pixlets of the first pixel and the fourth pixel, or a set of images acquired from the deflected small pixlets of the second pixel and fifth pixel, which are included in the first 2×2 pixel block or the second 2×2 pixel block, and calculates a depth between the image sensor and an object using a parallax between the images of the set.

According to an exemplary embodiment, a method of operating a camera system with a complementary pixlet structure comprising an image sensor, which includes a first 2×2 pixel block including a first pixel, a second pixel, and two third pixels, and a second 2×2 pixel block including a fourth pixel, a fifth pixel, the two third pixels—the two third pixels are disposed at positions diagonal to each other in a 2×2 pixel block and include deflected small pixlets deflected in opposite directions to be symmetrical to each other with respect to each pixel center, the first pixel and the fourth pixel are disposed at the same position within the 2×2 pixel block and include deflected small pixlets deflected in opposite directions to be symmetrical to each other with respect to each pixel center, the second pixel and fifth pixel are disposed at the same position within the 2×2 pixel block and include deflected small pixlets deflected in opposite directions to be symmetrical to each pixel center, and each pixlet includes an photodiode converting an optical signal to an electrical signal, and a depth calculator, includes introducing optical signals into the deflected small pixlets of the two third pixels included in the first 2×2 pixel block or the second 2×2 pixel block, the deflected small pixlets of the fourth pixel and the fifth pixel, and the deflected small pixlets of the second pixel and fifth pixel, respectively, processing the optical signals through one of the deflected small pixlets of the two third pixels included in the first 2×2 pixel block or the second 2×2 pixel block, the deflected small pixlets of the first pixel and the fourth pixel, and the deflected small pixlets of the second pixel and fifth pixel in the image sensor to obtain images, and calculating a depth between the image sensor and an object using a parallax between the images input from the image sensor, in the depth calculator.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
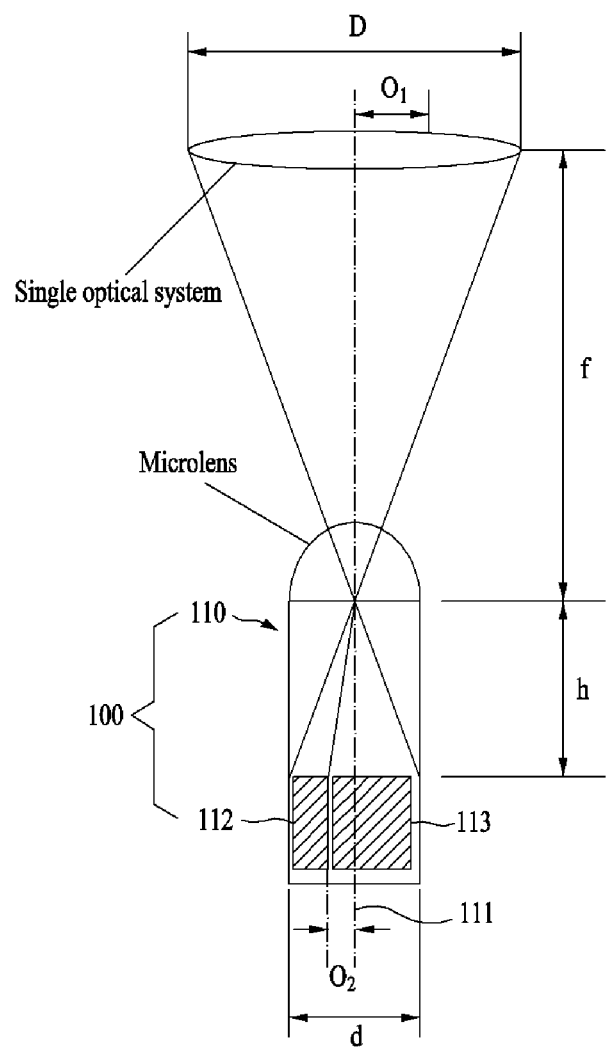
FIG. 1 is a diagram illustrating a principle of calculating a depth to an object from a camera system according to an embodiment.

Hereinafter, embodiments of the inventive concept will be described in detail with reference to the accompanying drawings. However, the inventive concept is not confined or limited by the embodiments. In addition, the same reference numerals shown in each drawing denote the same member.

In addition, it should be understood that various embodiments of the inventive concept are different, but need not be mutually exclusive. For example, certain shapes, structures, and features described herein may be implemented in other embodiments without departing from the spirit and scope of the inventive concept in connection with one embodiment. Furthermore, it should be understood that the positions, arrangements, or configurations of individual components in the scope of each of the embodiments presented may be changed without departing from the spirit and scope of the inventive concept.

A depth (hereinafter, "depth" refers to a distance between an object and an image sensor) of each of pixels included in a 2D image should be calculated to obtain a 3D image to which the depth is applied. Here, the conventional methods of calculating the depth of each pixel included in the 2D image include a time of flight (TOF) method which irradiates a laser to an object to be photographed and measures time the light returns, a stereo method that calculates a depth using a parallax between images acquired from two camera systems, a method (a parallax difference method using an aperture) which processes an optical signal passing through each of a plurality of apertures formed in a single optical system to calculate a depth using a parallax between acquired images in a single camera system, and a method which processes an optical signal passing through each of a plurality of apertures formed in a single optical system to calculate a depth using a blur change between acquired images in a single camera system.

Accordingly, following embodiments propose an image sensor with a complementary pixlet structure, in which two pixels are implemented in one pixel, to enable estimation of a depth to an object in a single camera system. Hereinafter, a pixlet disposed in a pixel may be a component including a photodiode converting an optical signal into an electrical signal and two pixlets with different light receiving areas from each other may be provided in the pixel. In addition, hereinafter, the complementary pixlet structure means a structure in which, in the pixel including a first pixlet and a second pixlet, when an area of the first pixlet is given in the pixel, an area of the second pixlet is capable of being calculated by subtracting an area of the first pixlet from the pixel area. However, the inventive concept is not confined or limited thereto, and when the pixel includes a deep trench isolation (DTI) for reducing interference between the first pixlet and second pixlet, the complementary pixlet structure means a structure in which when an area of the first pixlet is given in the pixel, an area of the second pixlet is capable of being calculated by subtracting the area of the first pixlet from an area excluding the DTI area from the pixel area.

In detail, embodiments suggest a technique in which a structure including deflected small pixlets deflected in opposite directions to be symmetrical to each other with respect to a center of a pixel, respectively, and large pixlets adjacent to the deflected small pixlets, respectively, to allow a camera system based on an image sensor including the related pixel to calculate a depth between the image sensor and an object using a parallax between images acquired from the deflected small pixlets. The above-described depth calculation method is based on offset aperture (OA).

FIG. 1 is a diagram illustrating a principle of calculating a depth to an object from a camera system according to an embodiment.

Referring to FIG. 1, according to an embodiment, an image sensor 100 with a complementary pixlet structure may include a deflected small pixlet 112 deflected in one direction with respect to a pixel center 111 and a large pixlet 113 disposed adjacent to the deflected small pixlet 112 in a pixel 110.

Here, the deflected small pixlet 112 (hereinafter, a left-deflected small pixlet) of the pixel 110 may be deflected in a left direction with respect to the pixel center 111 of the pixel 110, have a light-receiving area occupying only a part of a left area of the pixel 110 with respect to the pixel center 111, and be formed to be offset by a specific distance or more to the left from the pixel center 111 of the pixel 110.

Accordingly, an optical signal introduced through a single optical system disposed on the pixel 110 may be incident on the left-deflected small pixlet 112 of the pixel 110, through a principle as shown in the drawing, and thus $O_2$, which is a distance at which one edge of the left-deflected small pixlet 112 is offset from the pixel center 111 of the pixel 110, has a proportional relationship with $O_1$, which, when an aperture is formed on the single optical system, is a distance at which the aperture is offset from a center of the single optical system (the same as the center 111 of the pixel 110). In the drawing, "D" denotes a diameter of the single optical system, "f" denotes a focal length, "d" denotes a width of the pixel 110, and "h" denotes a distance from the microlens of the pixel 110 to the pixel center 111 of the pixel 110.

Therefore, the same principle as the aperture formed on the single optical system to be offset from the center of the single optical system (the same as the pixel center 111 of the pixel 110) may be applied to the left-deflected small pixlet 112 formed to be offset from the pixel center 111 of the pixel 110, and thus the camera system including the image sensor 100 may calculate a depth between an object and the image sensor 100 using an offset aperture (OA)-based depth calculation method.

As described above, as the offset aperture (OA)-based depth calculation method is applied, the principle of calculating the depth of the camera system with a complementary pixlet structure including the image sensor 100 is descried as a case based on a parallax difference method in the OA structure, but it is not confined or limited thereto. In addition, the principle may be based on various methods for calculating the depth in the image using two images forming the parallax.

In addition, it is described that the image sensor 100 includes one pixel 110, but not confined or limited thereto. In addition, a case including two pixels to which the complementary pixlet structure is applied may also calculate the depth between the image sensor 100 and the object based on the above-described principle.

FIGS. 2A to 2E are diagrams illustrating schematic structures of an image sensor included in a camera system according to an embodiment. In detail, FIGS. 2A to 2E are plan views illustrating schematic structures according to various embodiments of an image sensor according to an embodiment of the inventive concept.

Referring to FIGS. 2A to 2E, a camera system according to an embodiment may include an image sensor 200 and a depth calculator (not shown). Hereinafter, the camera system may be not confined or limited to including only the image sensor 200 and the depth calculator, and may further include a single optical system (not shown). In addition, hereinafter, it will be described that the camera system performs a calculating operation of a depth between an object and the image sensor 200, which means that the depth calculator included in the camera system performs the calculating operation.

The image sensor 200 may include a pixel array including at least one 2×2 pixel block 210. Here, the at least one 2×2 pixel block 210 may include a first pixel 211, a second pixel 212, and two third pixels 213 and 214. Hereinafter, a microlens (not shown) may be disposed on each of the first pixel 211, the second pixel 212, and the two third pixels 213 and 214 constituting at least one 2×2 pixel block 210, respectively.

The two third pixels 213 and 214 may be disposed at positions diagonal to each other in the 2×2 pixel block 210 and include deflected small pixlets 213-1 and 214-1, which are deflected in opposite directions to be symmetrical to each other with respect to pixel centers, respectively, and large pixlets 213-2 and 214-2 adjacent to the deflected small pixlets 213-1 and 214-1, respectively. For example, the deflected small pixlet 213-1 of the $(3-1)^{th}$ pixel 213 of the third pixels 213 and 214 may be deflected in a left direction with respect to a pixel center of the $(3-1)^{th}$ pixel 213, have a light-receiving area occupying only a part of a left area with respect to the pixel center, and be formed to be offset by a specific distance or more to the left from the pixel center of the $(3-1)^{th}$ pixel 213. In addition, the deflected small pixlet 214-1 of the $(3-2)^{th}$ pixel 214 may be deflected in a right direction with respect to a pixel center of the $(3-2)^{th}$ pixel 214, have a light-receiving area occupying only a part of a right area with respect to the pixel center, and be formed to be offset by a specific distance or more to the right from the pixel center of the $(3-2)^{th}$ pixel 214.

That is, 2×2 pixel block 210 of the image sensor 200 according to an embodiment includes the two third pixels 213 and 214, each of which includes the left-deflected small pixlet 213-1 and the right-deflected small pixlet 214-1 used for depth calculation.

Here, the deflected small pixlets 213-1 and 214-1 of the third pixels 213 and 214 may be disposed to maximize a distance apart from each other within each of the third pixels 213 and 214, respectively. This is because the depth calculation below is performed based on images acquired from the deflected small pixlets 213-1 and 214-1 of the third pixels 213 and 214, and depth resolution is consistently secured as a parallax between the images increases in the depth calculation.

Here, a distance, at which the deflected small pixlets 213-1 and 214-1 of the third pixels 213 and 214 are separated from each other, is related to a size and arrangement of each of the deflected small pixlets 213-1 and 214-1 of the third pixels 213 and 214. The size and arrangement are related to a distance at which each of the deflected small pixlets 213-1 and 214-1 of the third pixels 213 and 214 is offset from each pixel center of the third pixels 213 and 214, respectively.

Thus, maximizing the distance, at which the deflected small pixlets 213-1 and 214-1 of the third pixels 213 and 214 are separated from each other, may equivalent to maximizing the distance, at which each of the deflected small pixlets 213-1 and 214-1 of the third pixels 213 and 214 is offset from each pixel center of the third pixels 213 and 214, and therefore each of the deflected small pixlets 213-1 and 214-1 of the third pixels 213 and 214 may be formed to maximize the offset distance from each pixel center of the third pixels 213 and 214, respectively.

In particular, the offset distance of each of the deflected small pixlets 213-1 and 214-1 of the third pixels 213 and 214 from each pixel center of the third pixels 213 and 214 may be determined to maximize the parallax between the images acquired by the deflected small pixlets 213-1 and 214-1 of the third pixels 213 and 214, assuming that sensitivity of sensing optical signals in the deflected small pixlets 213-1 and 214-1 of the third pixels 213 and 214 is guaranteed to be greater than or equal to a predetermined level.

In this regard, referring to FIG. 1, $O_2$, which is the offset distance of each of the deflected small pixlets 213-1 and 214-1 of the third pixels 213 and 214 from each pixel center of the third pixels 213 and 214 has a proportional relationship to $O_1$, which is an offset distance from a center of a single optical system. That is, $O_1$ and $O_2$ may be expressed as Equation 1 below.

$$\frac{O_2}{h} = \frac{O_1}{nf} \qquad \text{<Equation 1>}$$

In Equation 1, "n" denotes a refractive index of a microlens of each of the third pixels 213 and 214, "f" denotes a focal length (a distance from a center of the image sensor 200 to the single optical system), and "h" denotes a distance from the microlens of each of the third pixels 213 and 214 to each center of the third pixels 213 and 214.

Meanwhile, due to experimental technique, when $O_1$, which is the offset distance from the center of the single optical system, is in a range as Equation 2 below, assuming that sensitivity of sensing the optical signals in the deflected small pixlets 213-1 and 214-1 of the third pixels 213 and 214 is guaranteed to be greater than or equal to the predetermined level, it is shown that the parallax between the images acquired from the deflected small pixlets 213-1 and 214-1 of the third pixels 213 and 214 is maximized.

$$a \cdot D \leq O_1 \leq b \cdot D \qquad \text{<Equation 2>}$$

In Equation 2, "D" denotes a diameter of the single optical system, "a" denotes a constant having a value of 0.2 or more, and "b" denotes a constant having a value of 0.47 or less.

Accordingly, Equation 1 may be expressed as Equation 3 below by Equation 2. Here, as illustrated in Equation 3, the offset distance of each of the deflected small pixlets 213-1 and 214-1 of each of the third pixels 213 and 214 from the pixel center of each of the third pixels 213 and 214 may be determined based on the refractive index of the microlens of each of the third pixels 213 and 214, the distance from the center of the image sensor 200 to the single optical system, the distance from the microlens of each of the third pixels 213 and 214 to the pixel center of each of the third pixels 213 and 214, and the diameter of the single optical system, to maximize the parallax between the images acquired from the deflected small pixlets 213-1 and 214-1 of the third pixels 213 and 214, assuming that the sensitivity of sensing the optical signals in the deflected small pixlets 213-1 and 214-1 of the third pixels 213 and 214 is guaranteed to be greater than or equal to the predetermined level.

$$a\frac{hD}{nf} \leq O_2 \leq b\frac{hD}{nf} \qquad \text{< Equation 3 >}$$

"a" denotes a constant having a value of 0.2 or more, and "b" denotes a constant having a value of 0.47 or less, and Equation 3 may be expressed as Equation 4 below.

$$0.2\frac{hD}{nf} \leq O_2 \leq 0.47\frac{hD}{nf} \qquad \text{< Equation 4 >}$$

In an embodiment, when "f" is 1.4D, "n" is 1.4, "h" is 2.9 um, and the pixel size is 2.8 um, $O_2$ may be calculated using Equation 4 above to have a range of 0.3 um$\leq O_2 \leq$0.7 um, thereby securing the parallax suitable for acquiring the depth.

Depending on the structure of the deflected small pixlets 213-1 and 214-1 of the third pixels 213 and 214, the large pixlets 213-2 and 214-2 of the third pixels 213 and 214 may be symmetrical to each other within the third pixels 213 and 214 and disposed adjacent to each other in a diagonal direction. For example, the large pixlet 213-2 of the $(3-1)^{th}$ pixel 213 may have a light-receiving area occupying an entire right area and a part of the left area with respect to a pixel center of the $(3-1)^{th}$ pixel 213 and be formed to be offset by a specific distance or more from the pixel center of the $(3-1)^{th}$ pixel 213. The large pixlet 214-2 of the $(3-2)^{th}$ pixel 214 may have a light-receiving area occupying an entire left area and a part of the right area with respect to a pixel center of the $(3-2)^{th}$ pixel 214 and be formed to be offset by a specific distance or more from the pixel center of the $(3-2)^{th}$ pixel 214.

Thus, the camera system including the image sensor 200 may calculate the depth from the image sensor 200 to the object, based on the OA-based depth calculation method described with reference to FIG. 1, using the parallax between the images acquired from the deflected small pixlets 213-1 and 214-1 of the third pixels 213 and 214 (the image acquired from the left-deflected small pixlet 213-1 of the (3-1)$^{th}$ pixel 213 and the image acquired from the right-deflected small pixlet 214-1 of the (3-2)$^{th}$ pixel 214). In detail, the image acquired from the left-deflected small pixlet 213-1 of the (3-1)$^{th}$ pixel 213 and the image acquired from the right-deflected small pixlet 214-1 of the (3-2)$^{th}$ pixel 214, which have the above-described structure, may be input to the depth calculator (not shown) included in the camera system. Then, in response to the input images, the depth calculator may calculate the depth to the object from the image sensor 200 using the parallax between the image acquired from the left-deflected small pixlet 213-1 of the (3-1)$^{th}$ pixel 213 and the image acquired from the right-deflected small pixlet 214-1 of the (3-2)$^{th}$ pixel 214.

Here, the images (the image acquired from left-deflected small pixlet 213-1 and the image acquired from the right-deflected small pixlet 214-1) input to the depth calculator may be not simultaneously input, but may be multiplexed by pixel unit to be input. Accordingly, the camera system may include a single processing device for image denoising, to sequentially process the multiplexed images. Here, the depth calculator may not perform image rectification for projecting the images into a common image plane.

In particular, the camera system including the image sensor 200 may regularly use the pixlets 213-1 and 214-1 for the depth calculating within the third pixels 213 and 214 to simplify a depth calculating algorithm and reduce work complexity, to reduce depth calculation time consumption and secure real-time, to simplify circuit configuration, and to ensure consistent depth resolution. Accordingly, the camera system including the image sensor 200 may be useful in an autonomous vehicle or various real-time depth measurement applications in which the consistency of depth resolution and real time are important.

Here, the camera system including the image sensor 200 may use the pixlets 213-2 and 214-2 for functions (e.g., color image formation and acquisition) other than the depth calculation, in addition to the pixlets 213-1 and 214-1 for the depth calculation, within the third pixels 213 and 214. For example, the image sensor 200 may form a color image based on the images acquired from the large pixlets 213-2 and 214-2 of the third pixels 213 and 214. In detail, the camera system including the image sensor 200 may merge the images acquired from the large pixlets 213-2 and 214-2 of the third pixels 213 and 214 and the images acquired the deflected small pixlets 213-1 and 214-1 of the third pixels 213 and 214 to form the color image.

In the above-described camera system including the image sensor 200, the pixlets 213-1 and 214-1 using for the depth calculation and the pixlets 213-2 and 214-2 for the functions other than the depth calculation, within the third pixels 213 and 214, may be differently set, to simplify an algorithm for the depth calculation and an algorithm for the functions other than the depth calculation and to secure real-time of the depth calculation and other functions, respectively.

Thus, the pixlets 213-1 and 214-1 using for the depth calculation and the pixlets 213-2 and 214-2 for the functions other than the depth calculation may be different, and therefore each of the pixlets 213-1, 214-2, 213-2, and 214-2 of the third pixels 213 and 214 may be a complimentary pixel in which each function is complementary in terms of color image acquisition and depth calculation functions.

The image sensor 200 having the structure described above may further include an additional component. As an example, a mask (not shown), which blocks peripheral rays of bundle of rays flowing into the deflected small pixlets 213-1 and 214-1 of the third pixels 213 and 214 and introduces only central rays thereinto, may be disposed on each of the deflected small pixlets 213-1 and 214-1 of each of the third pixels 213 and 214. The images acquired from the deflected small pixlets 213-1 and 214-1 of the third pixels 213 and 214 due to the mask may have depth greater than images acquired when introducing the periphery rays of the bundle of rays. As another example, a deep trench isolation (DTI) may be formed in each of the third pixels 213 and 214 to reduce interference between the reflected small pixlets 213-1 and 214-1 and the large pixlets 213-2 and 214-2, respectively. Here, the DTI may be formed between each of the deflected small pixlets 213-1 and 214-1 and each of the large pixlets 213-2 and 214-2, respectively.

Figure 2A:
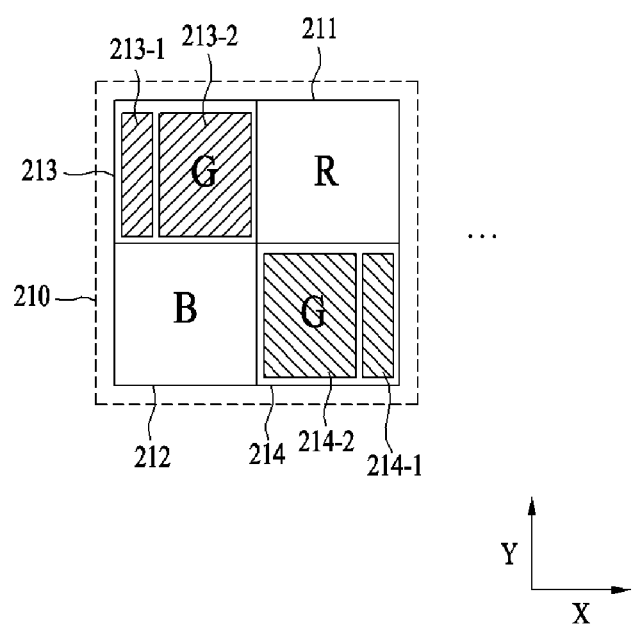
FIGS. 2A to 2E are diagrams illustrating schematic structures of an image sensor included in a camera system according to an embodiment.

As shown in FIG. 2A, although it is described that the first pixel 211 is an "R" pixel processing a red "R" optical signal, the second pixel 212 is a "B" pixel processing a blue "B" optical signal, and each of the third pixels 213 and 214 is a "G" pixel processing a green "G" optical signal, the inventive concept is not confined or limited thereto. In addition, the pixels may be implemented according to various embodiments to maximize the parallax between the images for depth calculation.

Figure 2B:
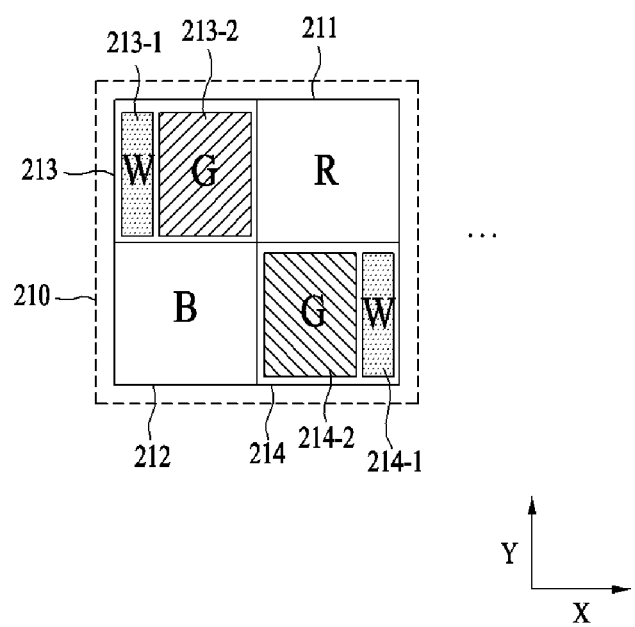

In particular, while each of the large pixlets 213-2 and 214-2 of each of the third pixels 213 and 214 is configured to process the "G" optical signal as shown in FIG. 2B, each of the deflected small pixlets 213-1 and 214-1 of the third pixels 213 and 214 may be configured to process a "W" optical signal. That is, each of the deflected small pixlets 213-1 and 214-1 of each of the third pixels 213 and 214 may be configured to process the "W" optical signal regardless of a wavelength of the optical signal processed in each of the large pixlets 213-2 and 214-2 of each of the third pixels 213 and 214, and therefore the parallax between the images acquired through the deflected small pixlets 213-1 and 214-1 of the third pixels 213 and 214 may be maximized and it may be expected that the deflected small pixlets 213-1 and 214-1 of the third pixels 213 and 214 operate in low luminance although areas thereof are small.

Figure 2C:
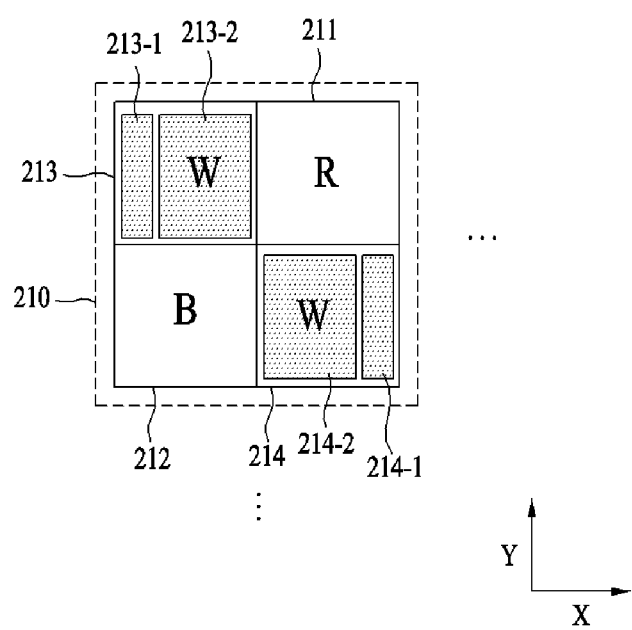

In addition, as shown in FIG. 2C, each of the third pixels 213 and 214 may be implemented as a "W" pixel processing a "W" optical signal, and therefore the deflected small pixlets 213-1 and 214-1 of the third pixels 213 and 214 and the large pixlets 213-2 and 214-2 of the third pixels 213 and 214 may process the "W" optical signals, respectively. Likewise in this case, the parallax between the images acquired through the deflected small pixlets 213-1 and 214-1 of the third pixels 213 and 214 may be maximized and it may be expected that the deflected small pixlets 213-1 and 214-1 of the third pixels 213 and 214 operate in low luminance although the areas thereof are small.

In addition, the first pixel 211 may be implemented as one of the "R" pixel processing the red "R" optical signal or the "G" pixel processing the green "G" optical signal, the second pixel 212 may be implemented as a "Y" pixel processing a yellow "Y" optical signal, and each of the two third pixels 213 and 214 may be implemented as the "W" pixel processing the "W" optical signal, thereby securing excellent color restoration and signal-to-noise ratio (SNR) of the 2×2 pixel block 210 of the image sensor 200.

Figure 2D:
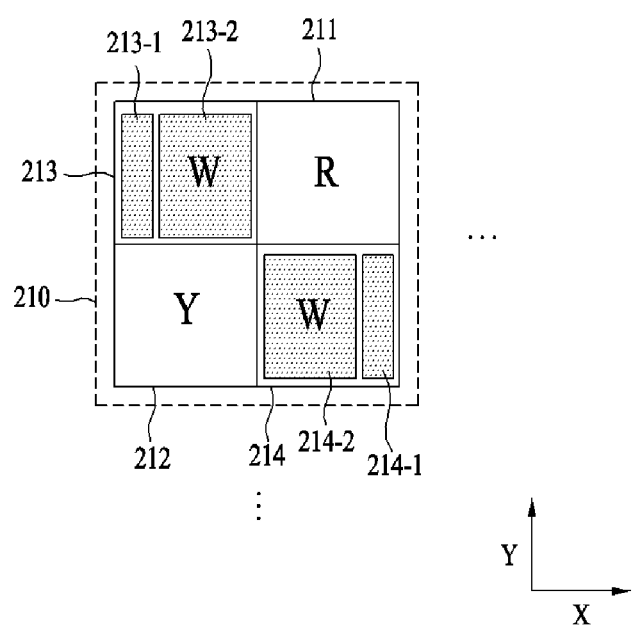

For example, as shown in FIG. 2D, the first pixel 211 may be implemented as the "R" pixel processing the "R" optical signal, the second pixel 212 may be implemented as the "Y"

pixel processing the "Y" optical signal, and each of the two third pixels 213 and 214 may be implemented as the "W" pixel processing the "W" optical signal, thereby securing the excellent color restoration and the SNR, compared to the 2×2 pixel block 210 including the "R" pixel, two "W" pixels, and "B" pixel. In this case, the image sensor 200 may generate a "G" optical signal-based image based on a difference between an optical signal ("Y" optical signal) of a wavelength processed by the "Y" pixel as the second pixel 212 and an optical signal ("R" optical signal) of a wavelength processed by the "R" pixel as the first pixel 211 ("G"="Y"–"R"), and may generate a "B" optical signal-based image based on a difference between an optical signal ("W" optical signal) of a wavelength processed by each of the "W" pixels as each of the two third pixels 213 and 214 and the optical signal ("Y" optical signal) of the wavelength processed by the "Y" pixel as the second pixel 212 ("B"="W"–"Y").

Figure 2E:
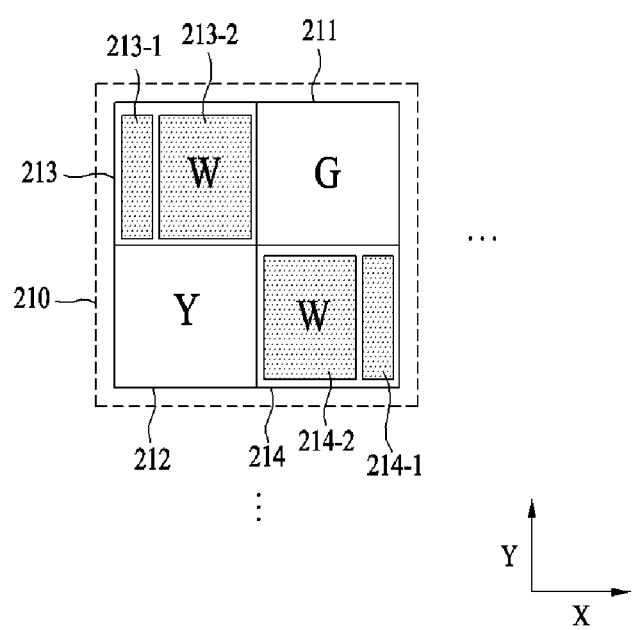

As another example, as shown in FIG. 2E, the first pixel 211 may be implemented as the "G" pixel processing the "G" optical signal, the second pixel 212 may be implemented as the "Y" pixel processing the "Y" optical signal, and each of the two third pixels 213 and 214 may be implemented as the "W" pixel processing the "W" optical signal, thereby securing the excellent color restoration and the SNR, compared to the 2×2 pixel block 210 including the "R" pixel, two "W" pixels, and "B" pixel. In this case, the image sensor 200 may generate a "R" optical signal-based image based on a difference between the optical signal ("Y" optical signal) of the wavelength processed by the "Y" pixel as the second pixel 212 and an optical signal ("G" optical signal) of a wavelength processed by the "G" pixel as the first pixel 211 ("R"="Y"–"G"), and may generate the "B" optical signal-based image based on the difference between the optical signal ("W" optical signal) of the wavelength processed by each of the "W" pixels as each of the two third pixels 213 and 214 and the optical signal ("Y" optical signal) of the wavelength processed by the "Y" pixel as the second pixel 212 ("B"="W"–"Y").

Figure 3:
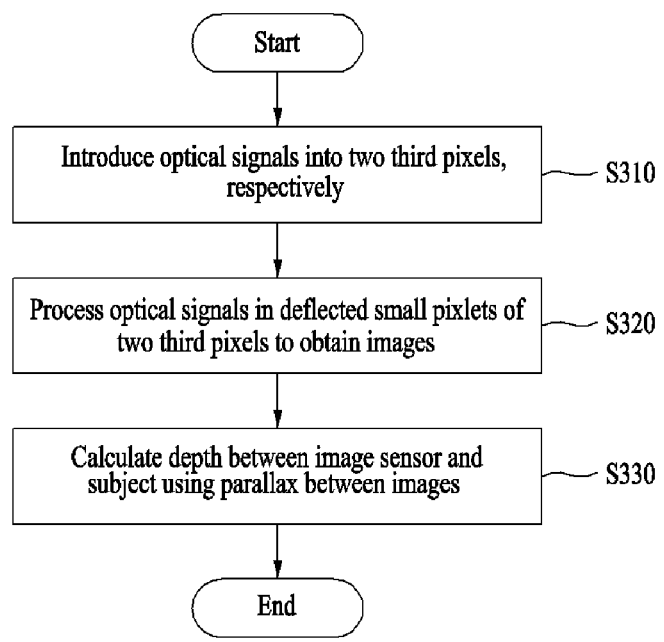
FIG. 3 is a flowchart illustrating a method of operating a camera system according to an embodiment.

FIG. 3 is a flowchart illustrating a method of operating a camera system according to an embodiment. The method of operating the camera system described below may be performed by the camera system including the image sensor and the depth calculator having the structure described above with reference to FIGS. 2A to 2E.

Referring to FIG. 3, the image sensor may introduce optical signals into the two third pixels, respectively, through S310. Here, the image sensor may be implemented in the structure (at least one 2×2 pixel block of the image sensor is implemented in the structure including the first pixel, the second pixel, and two third pixels) described above with reference to FIGS. 2A to 2E to include the deflected small pixlet and the large pixlet included in each of the two third pixels, and thus the optical signals may be introduced into the deflected small pixlets of the two third pixels, respectively, in S310.

Here, the two third pixels may be disposed at the positions diagonal to each other in the 2×2 pixel block and the deflected small pixlets may be disposed to be symmetrical to each other in the two third pixels, respectively, to maximize a distance apart from each other. In particular, an offset distance of the deflected small pixlet of each of the two third pixels from the pixel center of each of the two third pixels may be determined to maximize the parallax between the images acquired from deflected small pixlets of the two third pixels, assuming that sensitivity of sensing optical signals in the deflected small pixlets of the two third pixels is guaranteed to be greater than or equal to a predetermined level.

That is, the offset distance of the deflected small pixlet of each of the two third pixels from the pixel center of each of the two third pixels may be determined based on the refractive index of the microlens of each of the third pixels, the distance from the center of the image sensor to the single optical system, the distance from the microlens of each of the third pixels to the pixel center of each of the third pixels, and the diameter of the single optical system, to maximize the parallax between the images acquired from the deflected small pixlets of the third pixels, assuming that the sensitivity of sensing the optical signals in the deflected small pixlets of the third pixels is guaranteed to be greater than or equal to the predetermined level.

As examples in which the 2×2 pixel block of the image sensor is implemented are varied as shown in FIGS. 2A to 2E, the wavelengths of optical signals flowing into each of the third pixels in S310 may also be varied. For example, when the third pixels are "G" pixels as shown in FIG. 2A, the optical signals flowing into the third pixels in S310 may be the "G" optical signals. As another example, when the deflected small pixlet of each of the third pixels is configured to process the "W" optical signal as shown in FIG. 2B, the optical signal flowing into the deflected small pixlet of each of the third pixels in S310 may be the "W" optical signal. In addition, when the third pixels are the "W" pixels as shown in FIGS. 2C to 2E, the optical signals flowing into the third pixels in S310 may be the "W" optical signals.

Subsequently, the deflected small pixlets of the two third pixels process the optical signals, respectively, to obtain the images in the image sensor through S320.

In particular, the deflected small pixlet of each of the two third pixels in the 2×2 pixel block of the image sensor may be implemented to process the "W" optical signal, thereby maximizing the parallax between the images obtained in S320 and performing operation S320 in low luminance.

Thereafter, the depth calculator calculates the depth between the image sensor and the object using the parallax between the images input from the image sensor through S330.

In S320 to S330, the camera system may include and regularly use the pixlets for calculating the depth within one 2×2 pixel block, (the two third pixels are formed in one 2×2 pixel block and the reflected small pixlets of the two third pixels are used for the depth calculation), to simplify the depth calculating algorithm and reduce work complexity, to reduce depth calculation time consumption and secure real-time, to simplify circuit configuration, and to ensure consistent depth resolution.

In addition, although not shown in the drawings, the 2×2 pixel block of the image sensor may be configured to ensure the excellent color restoration and SNR, and thus the image sensor may generate the color image securing the excellent color restoration and SNR. For example, the image sensor may merge an image acquired from the first pixel, an image acquired from the second pixel, and the images acquired from the two third pixels, within the 2×2 pixel block to form the color image, thereby securing the excellent color restoration and SNR.

In addition to the structures described above, the image sensor may be configured as a pixel array repeated using two 2×2 pixel blocks as a basic pattern. A detailed description of this will be described below.

Figure 4A:
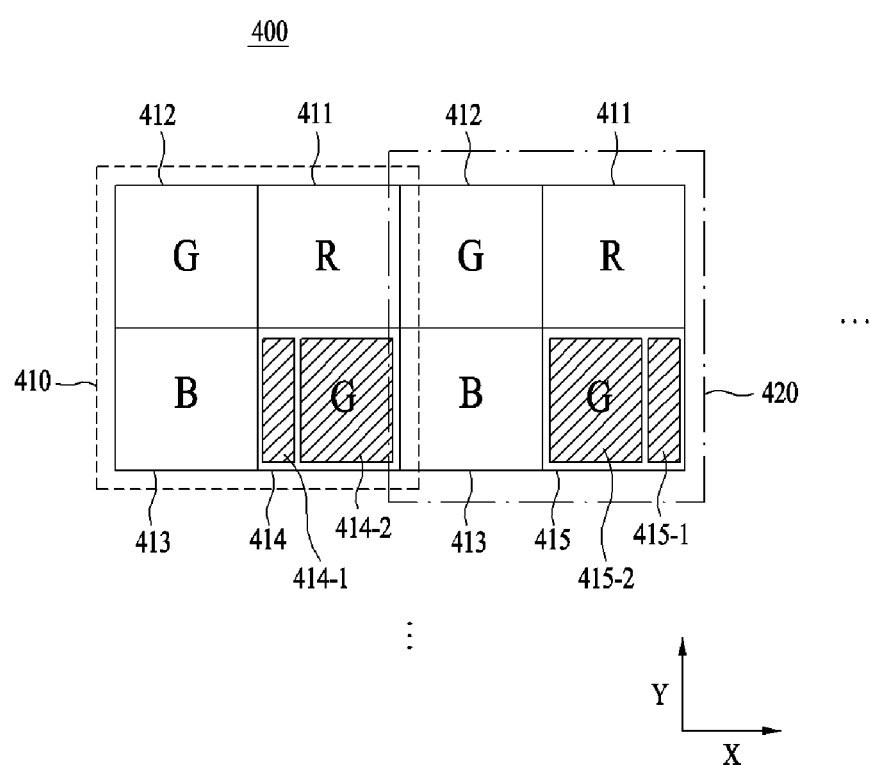
FIGS. 4A to 4C are diagrams illustrating schematic structures of an image sensor included in a camera system according to another embodiment.
Figure 4B:
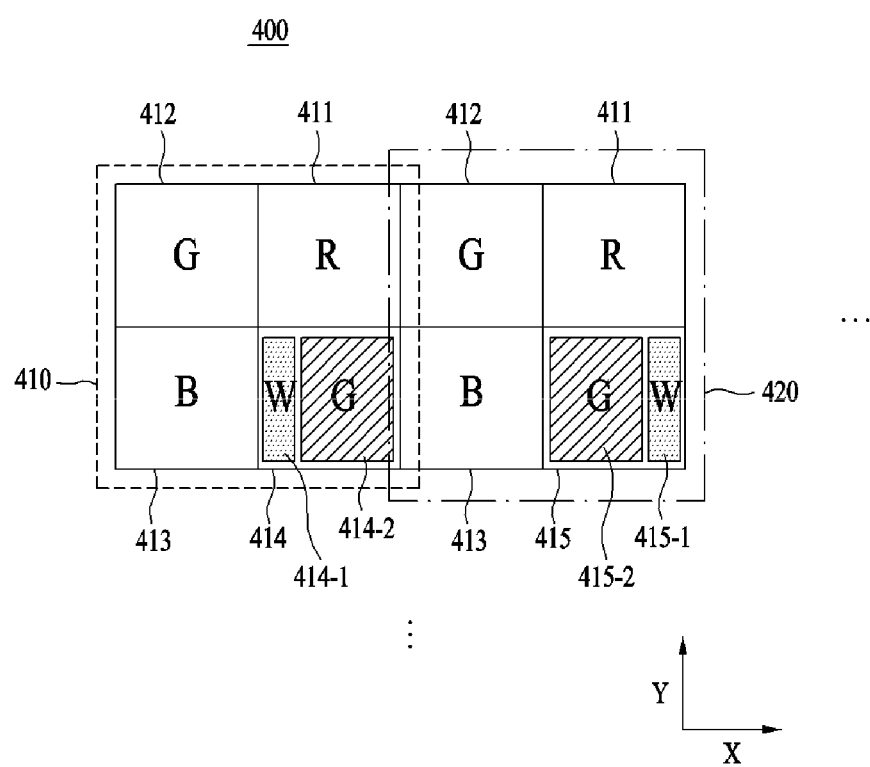
Figure 4C:
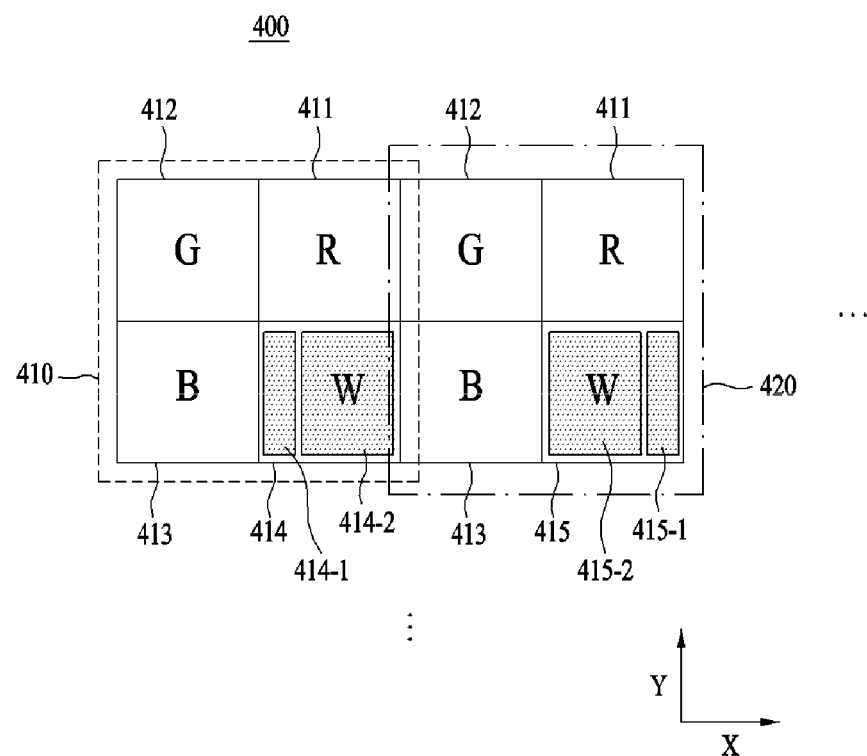

FIGS. 4A to 4C are diagrams illustrating schematic structures of an image sensor included in a camera system according to another embodiment. In detail, FIGS. 4A to 4C are plan views illustrating schematic structures according to various embodiments of an image sensor according to another embodiment.

Referring to FIGS. 4A to 4C, a camera system according to another embodiment may include an image sensor 400 and a depth calculator (not shown). Hereinafter, the camera system may be not confined or limited to including only the image sensor 400 and the depth calculator and further include a single optical system (not shown). In addition, hereinafter, it will be described that the camera system performs a calculating operation of a depth between an object and the image sensor 400, which means that the depth calculator included in the camera system performs the calculating operation.

The image sensor 400 may include a pixel array including at least two 2×2 pixel blocks 410 and 420. Here, the first 2×2 pixel block 410 of the at least two 2×2 pixel blocks 410 and 420 may include a first pixel 411, a second pixel 412, a third pixel 413, and a fourth pixel 414. In addition, the second 2×2 pixel block 420 may include the first pixel 411, the second pixel 412, the third pixel 413, and a fifth pixel 415. Hereinafter, a microlens (not shown) may be disposed on each of the first pixel 411, second pixel 412, third pixel 413, and fourth pixel 414 included in the first 2×2 pixel block 410, and each of the first pixel 411, second pixel 412, third pixel 413, and fifth pixel 415 included in the second 2×2 pixel block 420, respectively.

Each of the fourth pixel 414 and the fifth pixel 415 may be disposed at the same position within the 2×2 pixel blocks 410 and 420. In addition, the fourth pixel 414 and the fifth pixel 415 may include deflected small pixlets 414-1 and 415-1, which are deflected in opposite directions to be symmetrical to each other with respect to each pixel center, and large pixlets 414-2 and 415-2 adjacent to the deflected small pixlets 414-1 and 415-1, respectively. For example, the deflected small pixlet 414-1 of the fourth pixel 414 may be deflected in a left direction with respect to a pixel center of the fourth pixel 414, have a light-receiving area occupying only a part of a left area with respect to the pixel center, and be formed to be offset by a specific distance or more to the left from the pixel center of the fourth pixel 414. In addition, the deflected small pixlet 415-1 of the fifth pixel 415 may be deflected in a right direction with respect to a pixel center of the fifth pixel 415, have a light-receiving area occupying only a part of a right area with respect to the pixel center, and be formed to be offset by a specific distance or more to the right from the pixel center of the fifth pixel 415.

That is, the 2×2 pixel blocks 410 and 420 of the image sensor 400 according to another embodiment include the fourth pixel 414 and the fifth pixel 415 including the left-deflected small pixlet 414-1 and the right-deflected small pixlet used for depth calculation, respectively.

Here, the deflected small pixlet 414-1 of the fourth pixel 414 and the deflected small pixlet 415-1 of the fifth pixel 415 may be disposed to maximize a distance apart from each other within the fourth pixel 414 and the fifth pixel 415, respectively. This is because the depth calculation below is performed based on images acquired from the deflected small pixlet 414-1 of the fourth pixel 414 and the deflected small pixlet 415-1 of the fifth pixel 415 and depth resolution is consistently secured as a parallax between the images increases in the depth calculation.

Here, a distance, at which the deflected small pixlet 414-1 of the fourth pixel 414 and the deflected small pixlet 415-1 of the fifth pixel 415 are separated from each other, is related to a size and arrangement of each of the deflected small pixlet 414-1 of the fourth pixel 414 and the deflected small pixlet 415-1 of the fifth pixel 415. The size and arrangement are related to a distance at which each of the deflected small pixlet 414-1 of the fourth pixel 414 and the deflected small pixlet 415-1 of the fifth pixel 415 is offset from the pixel center of the fourth pixel 414 and the fifth pixel 415, respectively.

Thus, maximizing the distance, at which the deflected small pixlet 414-1 of the fourth pixel 414 and the deflected small pixlet 415-1 of the fifth pixel 415 are separated from each other, may be equivalent to maximizing the distance, at which each of the deflected small pixlet 414-1 of the fourth pixel 414 and the deflected small pixlet 415-1 of the fifth pixel 415 is offset from the pixel center of each of the fourth pixel 414 and the fifth pixel 415, respectively, and therefore each of the deflected small pixlet 414-1 of the fourth pixel 414 and the deflected small pixlet 415-1 of the fifth pixel 415 may be formed to maximize the offset distance from the pixel center of each of the fourth pixel 414 and the fifth pixel 415, respectively.

In particular, the offset distance of each of the deflected small pixlet 414-1 of the fourth pixel 414 and the deflected small pixlet 415-1 of the fifth pixel 415 from the pixel center of each of the fourth pixel 414 and the fifth pixel 415, respectively, may be determined to maximize the parallax between the images acquired by the deflected small pixlet 414-1 of the fourth pixel 414 and the deflected small pixlet 415-1 of the fifth pixel 415, assuming that sensitivity of sensing optical signals in the deflected small pixlet 414-1 of the fourth pixel 414 and the deflected small pixlet 415-1 of the fifth pixel 415 is guaranteed to be greater than or equal to a predetermined level.

In this regard, $O_2$, which is an offset distance of each of the deflected small pixlet 414-1 of the fourth pixel 414 and the deflected small pixlet 415-1 of the fifth pixel 415 from the pixel center of each of the fourth pixel 414 and the fifth pixel 415, respectively, may be determined, according to Equations 1 to 3 described above with reference to FIG. 2A, based on a refractive index of a microlens of each of the fourth pixel 414 and the fifth pixel 415, a distance from a center of the image sensor 400 to the single optical system, a distance from the microlens of each of the fourth pixel 414 and the fifth pixel 415 to the pixel center of each of the fourth pixel 414 and the fifth pixel 415, and a diameter of the single optical system, to maximize the parallax between the images acquired the deflected small pixlet 414-1 of the fourth pixel 414 and the deflected small pixlet 415-1 of the fifth pixel 415, assuming that the sensitivity of sensing the optical signals in the deflected small pixlet 414-1 of the fourth pixel 414 and the deflected small pixlet 415-1 of the fifth pixel 415 is guaranteed to be greater than or equal to the predetermined level.

Depending on the structure of the deflected small pixlet 414-1 of the fourth pixel 414 and the deflected small pixlet 415-1 of the fifth pixel 415, the large pixlet 414-2 of the fourth pixel 414 and the large pixlet 415-2 of the fifth pixel 415 may be symmetrical to each other within the fourth pixel 414 and the fifth pixel 415, respectively. For example, the large pixlet 414-2 of the fourth pixel 414 may have a light-receiving area occupying an entire right area and a part of the left area with respect to the pixel center of the fourth pixel 414 and be formed to be offset by a specific distance or more from the pixel center of the fourth pixel 414. In addition, the large pixlet 415-2 of the fifth pixel 415 may have a light-receiving area occupying an entire left area and a part of the right area with respect to the pixel center of the fifth pixel 415 and be formed to be offset by a specific distance or more from the pixel center of the fifth pixel 415.

Thus, the camera system including the image sensor 400 may calculate the depth from the image sensor 400 to the object, based on the OA-based depth calculation method described with reference to FIG. 1, using the parallax between the images acquired from the deflected small pixlets 414-1 and 415-1 of the fourth pixel 414 and the fifth pixel 415 (the image acquired from the left-deflected small pixlet 414-1 of the fourth pixel 414 and the image acquired from the right-deflected small pixlet 415-1 of the fifth pixel 415). In detail, the image acquired from the left-deflected small pixlet 414-1 of the fourth pixel 414 and the image acquired from the right-deflected small pixlet 415-1 of the fifth pixel 415 which have the above-described structure may be input to the depth calculator (not shown) included in the camera system. Then, in response to the input images, the depth calculator may calculate the depth to the object from the image sensor 400 using the parallax between the image acquired from the left-deflected small pixlet 414-1 of the fourth pixel 414 and the image acquired from the right-deflected small pixlet 415-1 of the fifth pixel 415.

Here, the images (the image acquired from the left-deflected small pixlet 414-1 and the image acquired from the right-deflected small pixlet 415-1) input to the depth calculator may be not simultaneously input, but may be multiplexed by pixel unit to be input. Accordingly, the camera system may include a single processing device for image denoising, to sequentially process the multiplexed images. Here, the depth calculator may not perform image rectification for projecting the images into a common image plane.

In particular, the camera system including the image sensor 400 may regularly use the pixlets 414-1 and 415-1 for the depth calculating within the two 2×2 pixel blocks 410 and 420 to simplify a depth calculating algorithm and reduce work complexity, to reduce depth calculation time consumption and secure real-time, to simplify circuit configuration, and to ensure consistent depth resolution. Accordingly, the camera system including the image sensor 400 may be useful in an autonomous vehicle or various real-time depth measurement applications in which the consistency of depth resolution and real time are important.

Here, the camera system including the image sensor 400 may use the pixlets 414-2 and 415-2 for functions (e.g., color image formation and acquisition) other than the depth calculation, in addition to the pixlets 414-1 and 415-1 for the depth calculation, within the fourth pixel 414 and the fifth pixel 415. For example, the image sensor 400 may form a color image based on the images acquired from the large pixlets 414-2 and 415-2 of the fourth pixel 414 and the fifth pixel 415. In detail, the camera system including the image sensor 400 may merge the images acquired from the large pixlets 414-2 and 415-2 of the fourth pixel 414 and the fifth pixel 415 and the images acquired from the deflected small pixlets 414-1 and 415-1 of the fourth pixel 414 and the fifth pixel 415 to form the color image.

In the above-described camera system including the image sensor 400, the pixlets 414-1 and 415-1 for the depth calculation and the pixlets 414-2 and 415-2 for the functions other than the depth calculation, within the two 2×2 pixel blocks 410 and 420, may be differently set, to simplify an algorithm for the depth calculation and an algorithm for the functions other than the depth calculation and to secure real-time of the depth calculation and other functions, respectively.

Thus, the pixlets 414-1 and 415-1 for the depth calculation and the pixlets 414-2 and 415-2 for the functions other than the depth calculation may be different in the two 2×2 pixel blocks 410 and 420, and therefore each of the pixlets 414-1, 414-2, 415-1, and 415-2 of the fourth pixel 414 and the fifth pixel 415 may be a complimentary pixel in which each function is complementary in terms of color image acquisition and depth calculation functions.

The image sensor 400 having the structure described above may further include an additional component. As an example, a mask (not shown), which blocks peripheral rays of bundle of rays flowing into the deflected small pixlets 414-1 and 415-1 of the fourth pixel 414 and the fifth pixel 415 and introduces only central rays thereinto, may be disposed on each of the deflected small pixlets 414-1 and 415-1 of the fourth pixel 414 and the fifth pixel 415. The images acquired from the deflected small pixlets 414-1 and 415-1 of the fourth pixel 414 and the fifth pixel 415 using the mask may have depth greater than images acquired when introducing the periphery rays of the bundle of rays. As another example, a deep trench isolation (DTI) may be formed in each of the fourth pixel 414 and the fifth pixel 415 to reduce interference between the reflected small pixlets 414-1 and 415-1 and the large pixlets 414-2 and 415-2, respectively. Here, the DTI may be formed between each of the deflected small pixlets 414-1 and 415-1 and each of the large pixlets 414-2 and 415-2, respectively.

As shown in FIG. 4A, although it is described that the first pixel 411 is an "R" pixel processing a red "R" optical signal, the second pixel 412 is a "G" pixel processing a green "G" optical signal, the third pixel 413 is a "B" pixel processing a blue "B" optical signal, the fourth pixel 414 is a "G" pixel processing a green "G" optical signal, and the fifth pixel 415 is a "G" pixel, the inventive concept is not confined or limited thereto. In addition, the pixels may be implemented according to various embodiments to maximize the parallax between the images for depth calculation.

In particular, while each of the large pixlets 414-2 and 415-2 of each of the fourth pixel 414 and the fifth pixel 415 is configured to process the "G" optical signal as shown in FIG. 4B, each of the deflected small pixlets 414-1 and 415-1 of each of the fourth pixel 414 and the fifth pixel 415 may be configured to process a "W" optical signal. That is, each of the deflected small pixlets 414-1 and 415-1 of each of the fourth pixel 414 and the fifth pixel 415 may be configured to process the "W" optical signal regardless of a wavelength of the optical signal processed in each of the large pixlets 414-2 and 415-2 of each of the fourth pixel 414 and the fifth pixel 415, and therefore the parallax between the images acquired through the deflected small pixlets 414-1 and 415-1 of the fourth pixel 414 and the fifth pixel 415 may be maximized and it may be expected that the deflected small pixlets 414-1 and 415-1 of the fourth pixel 414 and the fifth pixel 415 operate in low luminance although areas thereof are small.

In addition, as shown in FIG. 4C, each of the fourth pixel 414 and the fifth pixel 415 is implemented as a "W" pixel processing a "W" optical signal, and therefore the deflected small pixlets 414-1 and 415-1 of the fourth pixel 414 and the fifth pixel 415 and the large pixlets 414-2 and 415-2 of the fourth pixel 414 and the fifth pixel 415 may process the "W" optical signals. Likewise in this case, the parallax between the images acquired through the deflected small pixlets 414-1 and 415-1 of the fourth pixel 414 and the fifth pixel 415 may be maximized and it may be expected that the deflected small pixlets 414-1 and 415-1 of the fourth pixel 414 and the fifth pixel 415 operate in low luminance although the areas thereof are small.

Figure 5:
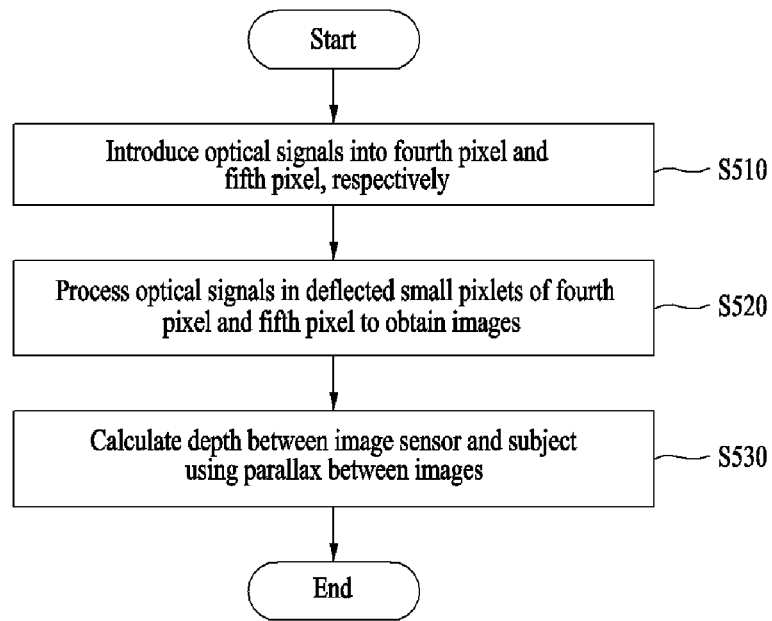
FIG. 5 is a flowchart illustrating a method of operating a camera system according to another embodiment.

FIG. 5 is a flowchart illustrating a method of operating a camera system according to another embodiment. The method of operating the camera system described below may be performed by the camera system including the image sensor and the depth calculator having the structure described above with reference to FIGS. 4A to 4C.

Referring to FIG. 5, the image sensor may introduce the optical signal into each of the fourth pixel and the fifth pixel through S510. Here, the image sensor may be implemented in the structure described above with reference to FIGS. 4A to 4C (implemented in the structure in which the first 2×2 pixel block of the image sensor includes the first pixel, the second pixel, the third pixel, and the fourth pixel, and the second 2×2 pixel block includes the first pixel, the second pixel, the third pixel, and the fifth pixel) and include the deflected small pixlet and the large pixlet in each of the fourth pixel and the fifth pixel, and therefore the optical signal may be introduced into the deflected small pixlet of each of the fourth pixel and the fifth pixel in S510.

Here, the fourth pixel and the fifth pixel may be disposed at the same position within the 2×2 pixel block and the deflected small pixlets may be disposed symmetrically to each other in the fourth pixel and the fifth pixel, respectively, to maximize the distance apart from each other. In particular, the offset distance of the deflected small pixlet of each of the fourth pixel and the fifth pixel from the pixel center of each of the fourth pixel and the fifth pixel may be determined to maximize the parallax between the images acquired from deflected small pixlets of the fourth pixel and the fifth pixel, assuming that sensitivity of sensing optical signals in the deflected small pixlets of the fourth pixel and the fifth pixel is guaranteed to be greater than or equal to a predetermined level.

That is, the offset distance of the deflected small pixlet of each of the fourth pixel and the fifth pixel from the pixel center of each of the fourth pixel and the fifth pixel may be determined based on the refractive index of the microlens of each of the fourth pixel and the fifth pixel, the distance from the center of the image sensor to the single optical system, the distance from the microlens of each of the fourth pixel and the fifth pixel to the pixel center of each of the fourth pixel and the fifth pixel, and the diameter of the single optical system, to maximize the parallax between the images acquired from the deflected small pixlets of the fourth pixel and the fifth pixel, assuming that the sensitivity of sensing the optical signals in the deflected small pixlets of the fourth pixel and the fifth pixel is guaranteed to be greater than or equal to the predetermined level.

As examples in which the two 2×2 pixel blocks of the image sensor is implemented are varied as shown in FIGS. 4A to 4C, the wavelengths of optical signals flowing into each of the fourth pixel and the fifth pixel in S510 may also be varied. For example, when the fourth pixel and the fifth pixel are "G" pixels as shown in FIG. 4A, the optical signals flowing into the fourth pixel and the fifth pixel in S510 may be the "G" optical signals. As another example, when the deflected small pixlet of each of the fourth pixel and the fifth pixel is configured to process the "W" optical signal as shown in FIG. 4B, the optical signal flowing into each of the deflected small pixlets of each of the fourth pixel and the fifth pixel in S510 may be the "W" optical signal. In addition, when the fourth pixel and the fifth pixel are the "W" pixels as shown in FIG. 4C, the optical signals flowing into the fourth pixel and the fifth pixel in S510 may be the "W" optical signals.

Subsequently, the image sensor processes the optical signal in the deflected small pixlet of each of the fourth pixel and the fifth pixel, to obtain images through S520.

In particular, the deflected small pixlet of each of the fourth pixel and the fifth pixel in each of the two 2×2 pixel blocks of the image sensor may be implemented to process the "W" optical signal, thereby maximizing the parallax between the images obtained in S520 and performing operation S520 in low luminance.

Thereafter, the depth calculator calculates the depth between the image sensor and the object using the parallax between the images input from the image sensor through S530.

In S320 and S330, the camera system may include and regularly use the pixlets for calculating the depth within the two 2×2 pixel blocks, (the fourth pixel and the fifth pixel are formed in two 2×2 pixel blocks, respectively, and the reflected small pixlets of the fourth pixel and the fifth pixel are used for the depth calculation), to simplify the depth calculating algorithm and reduce work complexity, to reduce depth calculation time consumption and secure real-time, to simplify circuit configuration, and to ensure consistent depth resolution.

In addition, although not shown in the drawings, the image sensor may regularly use the pixlets for generating the color image, in addition to the pixlets for the depth calculation, to generate the color image securing excellent color restoration and SNR. For example, the image sensor may merge the images acquired from the first pixels, the images acquired from the second pixels, the images acquired from the third pixels, and the images acquired from the large pixlets of the fourth pixel and the fifth pixel to form the color image, thereby securing the excellent color restoration and SNR.

Figure 6A:
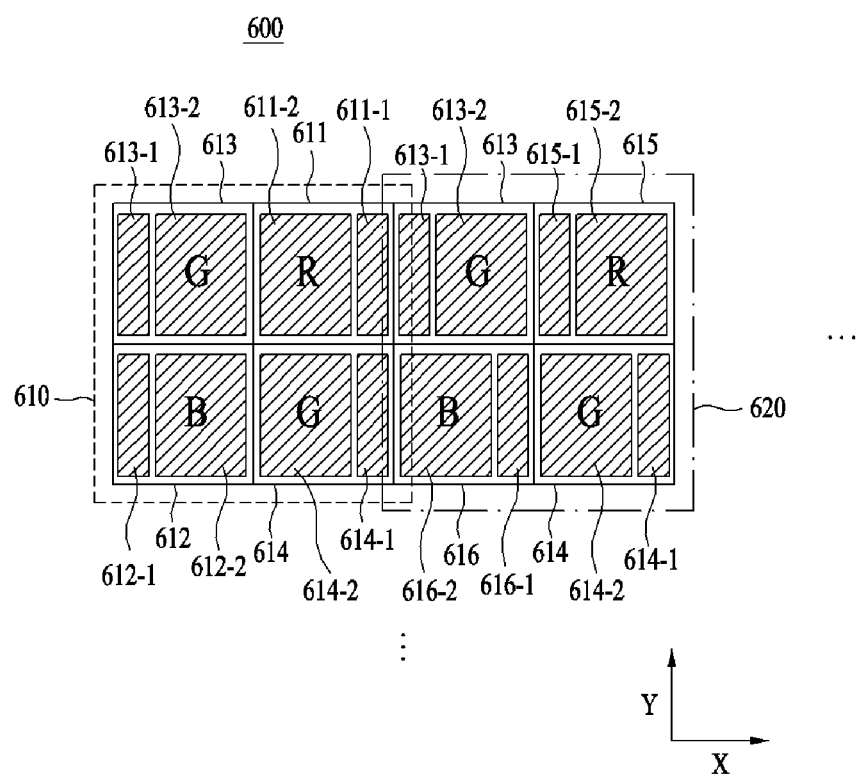
FIGS. 6A to 6C are diagrams illustrating schematic structures of an image sensor included in a camera system according to still another embodiment.
Figure 6B:
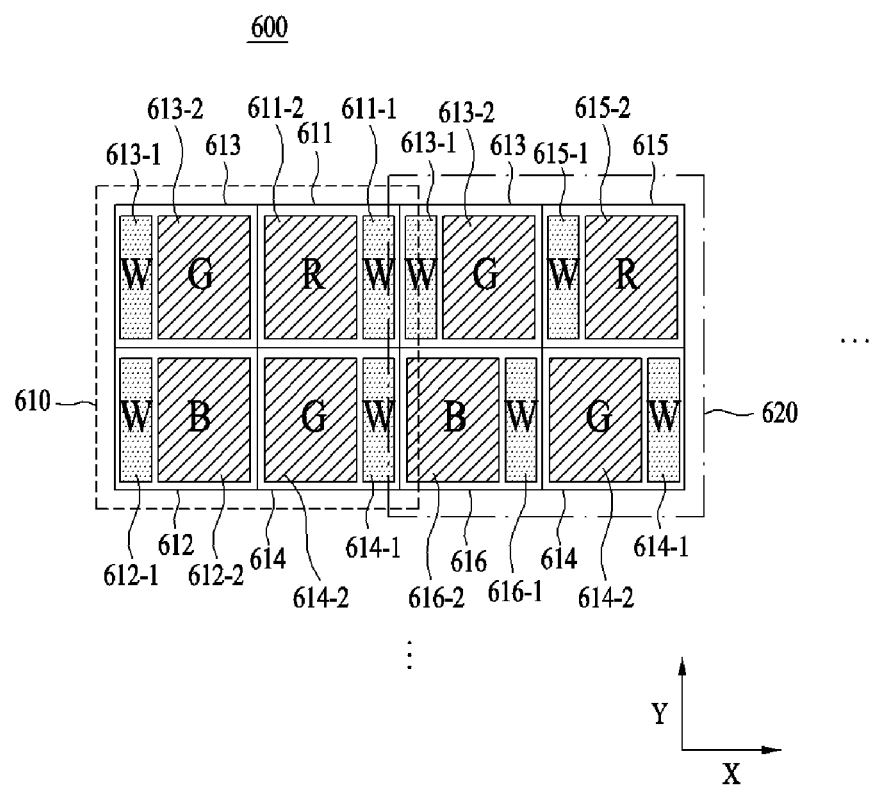
Figure 6C:
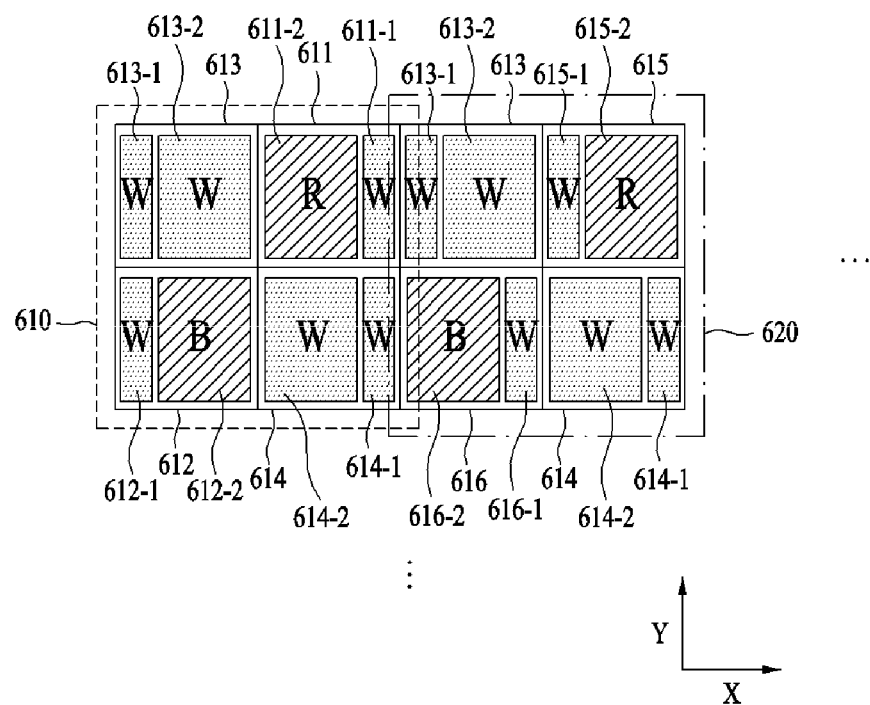

FIGS. 6A to 6C are diagrams illustrating schematic structures of an image sensor included in a camera system according to still another embodiment. In detail, FIGS. 6A to 6C are plan views illustrating schematic structures according to various embodiments of an image sensor according to still another embodiment.

Referring to FIGS. 6A to 6C, a camera system according to another embodiment may include an image sensor 600 and a depth calculator (not shown). Hereinafter, the camera system may be not confined or limited to including only the image sensor 600 and the depth calculator and may further include a single optical system (not shown). In addition, hereinafter, it will be described that the camera system performs a calculating operation of a depth between an object and the image sensor 600, which means that the depth calculator included in the camera system performs the calculating operation.

The image sensor 600 may include a pixel array including at least two 2×2 pixel blocks 610 and 620. Here, the first 2×2 pixel block 610 of the at least two 2×2 pixel blocks 610 and 620 may include a first pixel 611, a second pixel 612, and two third pixels 613 and 614. In addition, the second 2×2 pixel block 620 may include a fourth pixel 615, a fifth pixel 616, and the two third pixels 613 and 614. Hereinafter, a microlens (not shown) may be disposed on each of the first pixel 611, the second pixel 612, the two third pixels 613 and 614 included in the first 2×2 pixel block 610, and each of the fourth pixel 615, the fifth pixel 616, and the two third pixels 613 and 614 included in the second 2×2 pixel block 620, respectively.

The two third pixels 613 and 614 may be disposed at positions diagonal to each other in the 2×2 pixel blocks 610 and 620, respectively, and may include deflected small pixlets 613-1 and 614-1, which are deflected in opposite directions to be symmetrical to each other with respect to each pixel center, and large pixlets 613-2 and 614-2 adjacent to the deflected small pixlets 613-1 and 614-1, respectively. For example, the deflected small pixlet 613-1 of the $(3\text{-}1)^{th}$ pixel 613 of the third pixels 613 and 614 may be deflected in a left direction with respect to a pixel center of the $(3\text{-}1)^{th}$ pixel 613, have a light-receiving area occupying only a part of a left area with respect to the pixel center, and be formed to be offset by a specific distance or more to the left from the pixel center of the $(3\text{-}1)^{th}$ pixel 613. In addition, the deflected small pixlet 614-1 of the $(3\text{-}2)^{th}$ pixel 614 may be deflected in a right direction with respect to a pixel center of the $(3\text{-}2)^{th}$ pixel 614, have a light-receiving area occupying only a part of a right area with respect to the pixel center, and be formed to be offset by a specific distance or more to the left from the pixel center of the $(3\text{-}2)^{th}$ pixel 614.

Each of the first pixel 611 and the fourth pixel 615 may be disposed at the same position within the 2×2 pixel blocks 610 and 620, respectively. In addition, the first pixel 611 and the fourth pixel 615 may include deflected small pixlets 611-1 and 615-1, which are deflected in opposite directions to be symmetrical to each other with respect to each pixel center, and large pixlets 611-2 and 615-2 adjacent to the deflected small pixlets 611-1 and 615-1, respectively. For example, the deflected small pixlet 611-1 of the first pixel 611 may be deflected in a right direction with respect to a pixel center of the first pixel 611, have a light-receiving area occupying only a part of a right area with respect to the pixel center, and be formed to be offset by a specific distance or more to the right from the pixel center of the first pixel 611. In addition, the deflected small pixlet 615-1 of the fourth pixel 615 may be deflected in a left direction with respect to a pixel center of the fourth pixel 615, have a light-receiving area occupying only a part of a left area with respect to the pixel center, and be formed to be offset by a specific distance or more to the left from the pixel center of the fourth pixel 615.

Each of the second pixel 612 and the fifth pixel 616 may be disposed at the same position within the 2×2 pixel blocks 610 and 620, respectively. In addition, the second pixel 612 and the fifth pixel 616 may include deflected small pixlets 612-1 and 616-1, which are deflected in opposite directions to be symmetrical to each other with respect to each pixel center, and large pixlets 612-2 and 616-2 adjacent to the deflected small pixlets 612-1 and 616-1, respectively. For example, the deflected small pixlet 612-1 of the second pixel 612 may be deflected in a left direction with respect to a pixel center of the second pixel 612, have a light-receiving area occupying only a part of a left area with respect to the pixel center, and be formed to be offset by a specific distance or more to the left from the pixel center of the second pixel 612. In addition, the deflected small pixlet 616-1 of the fifth pixel 616 may be deflected in a right direction with respect to a pixel center of the fifth pixel 616, have a light-receiving area occupying only a part of a right area with respect to the pixel center, and be formed to be offset by a specific distance or more to the right from the pixel center of the fifth pixel 616.

That is, all pixels 611, 612, 613, 614, 615, and 616 included in the 2×2 pixel blocks 610 and 620 of the image sensor 600 according to another embodiment include the deflected small pixlets 611-1, 612-1, 613-1, 614-1, 615-1, and 616-1 used for depth calculation, respectively.

Here, the deflected small pixlets 613-1 and 614-1 of each of the third pixels 613 and 614 may be disposed to maximize a distance apart from each other within the third pixels 613 and 614, respectively. This is because the depth calculation below is performed based on images acquired from the deflected small pixlets 613-1 and 614-1 of the third pixels 613 and 614 and depth resolution is consistently secured as a parallax between the images increases in the depth calculation.

Here, a distance, at which the deflected small pixlets 613-1 and 614-1 of the third pixels 613 and 614 are separated from each other, is related to a size and arrangement of each of the deflected small pixlets 613-1 and 614-1 of each of the third pixels 613 and 614. The size and arrangement are related to a distance, at which each of the deflected small pixlets 613-1 and 614-1 of each of the third pixels 613 and 614 is offset from the pixel center of each of the third pixels 613 and 614, respectively.

Thus, maximizing the distance, at which the deflected small pixlets 613-1 and 614-1 of the third pixels 613 and 614 are separated from each other, may equivalent to maximizing the distance, at which each of the deflected small pixlets 613-1 and 614-1 of each of the third pixels 613 and 614 is offset from the pixel center of each of the third pixels 613 and 614, and therefore each of the deflected small pixlets 613-1 and 614-1 of the third pixels 613 and 614 may be formed to maximize the offset distance from the pixel center of each of the third pixels 613 and 614.

In particular, the offset distance of each of the deflected small pixlets 613-1 and 614-1 of each of the third pixels 613 and 614 from the pixel center of each of the third pixels 613 and 614 may be determined to maximize a parallax between images acquired by the deflected small pixlets 613-1 and 614-1 of the third pixels 613 and 614, assuming that sensitivity of sensing optical signals in the deflected small pixlets 613-1 and 614-1 of the third pixels 613 and 614 is guaranteed to be greater than or equal to a predetermined level.

In this regard, $O_2$, which is an offset distance of each of the deflected small pixlets 613-1 and 614-1 of each of the third pixels 613 and 614 from the pixel center of each of the third pixels 613 and 614 may be determined, according to Equations 1 to 3 described above with reference to FIGS. 2A and 2B, based on a refractive index of a microlens of each of the third pixels 613 and 614, a distance from a center of the image sensor 600 to the single optical system, a distance from the microlens of each of the third pixels 613 and 614 to the pixel center of each of the third pixels 613 and 614, and a diameter of the single optical system, to maximize the parallax between the images acquired from the deflected small pixlets 613-1 and 614-1 of the third pixels 613 and 614, assuming that the sensitivity of sensing the optical signals in the deflected small pixlets 613-1 and 614-1 of the third pixels 613 and 614 is guaranteed to be greater than or equal to the predetermined level.

Depending on the structure of the deflected small pixlets 613-1 and 614-1 of the third pixels 613 and 614, the large pixlets 613-2 and 614-2 of the third pixels 613 and 614 may be symmetrical to each other within the third pixels 613 and 614, respectively. For example, the large pixlet 613-2 of the $(3\text{-}1)^{th}$ pixel 613 of the third pixels 613 and 614 may have a light-receiving area occupying an entire right area and a part of the left area with respect to the pixel center of the $(3\text{-}1)^{th}$ pixel 613 and be formed to be offset by a specific distance or more from the pixel center of the $(3\text{-}1)^{th}$ pixel 613. In addition, the large pixlet 614-2 of the $(3\text{-}2)^{th}$ pixel 614 may have a light-receiving area occupying an entire left area and a part of the right area with respect to the pixel center of the $(3\text{-}2)^{th}$ pixel 614 and be formed to be offset by a specific distance or more from the pixel center of the $(3\text{-}2)^{th}$ pixel 614.

Thus, the camera system including the image sensor 600 may calculate a depth from the image sensor 600 to an object, based on the OA-based depth calculation method described with reference to FIG. 1, using the parallax between the images acquired from the deflected small pixlets 613-1 and 614-1 of the third pixels 613 and 614 included in the first 2×2 pixel block 610 or the second 2×2 pixel block 620 (one of a set of images acquired from the deflected small pixlets 613-1 and 614-1 of the third pixels 613 and 614 included in the first 2×2 pixel block 610 or a set of images acquired from the deflected small pixlets 613-1 and 614-1 of the third pixels 613 and 614 included in the second 2×2 pixel block 620).

Here, the images (the images acquired from the deflected small pixlets 613-1 and 614-1 of the third pixels 613 and 614 included in the first 2×2 pixel block 610 or the images acquired from the deflected small pixlets 613-1 and 614-1 of the third pixels 613 and 614 included in the second 2×2 pixel block 620) input to the depth calculator may be not simultaneously input, but may be multiplexed by pixel unit to be input. Accordingly, the camera system may include a single processing device for image denoising, to sequentially process the multiplexed images. Here, the depth calculator may not perform image rectification for projecting the images into a common image plane.

In addition, the camera system including the image sensor 600 may calculate the depth between the image sensor 600 and the object using the parallax between the images acquired from the deflected small pixlets 611-1 and 615-1 of the first pixel 611 and the fourth pixel 615.

Furthermore, the camera system including the image sensor 600 may calculate the depth between the image sensor 600 and the object using the parallax between the images acquired from the deflected small pixlets 612-1 and 616-1 of the second pixel 612 and the fifth pixel 616.

That is, the depth calculator may selectively receive one set of a set of the images acquired from the deflected small pixlets 613-1 and 614-1 of the third pixels 613 and 614, a set of the images acquired from the deflected small pixlets 611-1 and 615-1 of the first pixel 611 and the fourth pixel 615, or a set of the images acquired from each of the deflected small pixlets 612-1 and 616-1 of the second pixel 612 and the fifth pixel 616, and then may calculate the depth between the image sensor 600 and the object using the parallax between the images of the received set.

Here, the depth calculator may selectively receive one set of the set of the images acquired from the deflected small pixlets 613-1 and 614-1 of the third pixels 613 and 614, the set of the images acquired from the deflected small pixlets 611-1 and 615-1 of the first pixel 611 and the fourth pixel 615, or the set of the images acquired from each of the deflected small pixlets 612-1 and 616-1 of the second pixel 612 and the fifth pixel 616, and then use the selected set of the images for the depth calculation, thereby improving accuracy of the depth calculation.

Here, the camera system including the image sensor 600 may use the large pixlets 613-2 and 614-2 of the third pixels 613 and 614, the large pixlets 611-2 and 615-2 of the first pixel 611 and the fourth pixel 615, or the large pixlets 612-2 and 616-2 of the second pixel 612 and the fifth pixel 616 for functions (e.g., color image formation and acquisition) other than the depth calculation. For example, the image sensor 600 may merge images acquired from the large pixlets 613-2 and 614-2 of the third pixels 613 and 614, images acquired from the large pixlets 611-2 and 615-2 of the first pixel 611 and the fourth pixel 615, and images acquired from the large pixlets 612-2 and 616-2 of the second pixel 612 and the fifth pixel 616 to form a color image.

In the above-described camera system including the image sensor 600, the pixlets 611-1, 612-1, 613-1, 614-1, 615-1, and 616-1 for the depth calculation and the pixlets 611-2, 612-2, 613-2, 614-2, 615-2, and 616-2 for the functions other than the depth calculation, within the two 2×2 pixel blocks 610 and 620, may be differently set, to simplify an algorithm for the depth calculation and an algorithm for the functions other than the depth calculation and to secure real-time of the depth calculation and other functions, respectively.

Thus, the pixlets 611-1, 612-1, 613-1, 614-1, 615-1, and 616-1 for the depth calculation and the pixlets 611-2, 612-2, 613-2, 614-2, 615-2, and 616-2 for the functions other than the depth calculation may be different in the two 2×2 pixel blocks 610 and 620, and therefore each of the deflected small pixlet and the large pixlet included in the each pixel may be a complimentary pixel in which each function is complementary in terms of color image acquisition and depth calculation functions.

The image sensor 600 having the structure described above may further include an additional component. As an example, a mask (not shown), which blocks peripheral rays of bundle of rays flowing into the deflected small pixlets 613-1 and 614-1 of the third pixels 613 and 614, the deflected small pixlets 611-1 and 615-1 of the first pixel 611 and the fourth pixel 615, and the deflected small pixlets 612-1 and 616-1 of the second pixel 612 and the fifth pixel 616 and introduces only central rays thereinto, may be disposed on each of the deflected small pixlets 613-1 and 614-1 of the third pixels 613 and 614, the deflected small pixlets 611-1 and 615-1 of the first pixel 611 and the fourth pixel 615, and the deflected small pixlets 612-1 and 616-1 of the second pixel 612 and the fifth pixel 616, respectively. The images acquired from the deflected small pixlets 613-1 and 614-1 of the third pixels 613 and 614, the deflected small pixlets 611-1 and 615-1 of the first pixel 611 and the fourth pixel 615, and the deflected small pixlets 612-1 and 616-1 of the second pixel 612 and the fifth pixel 616 using the mask may have depth greater than images acquired when introducing the periphery rays of the bundle of rays. As another example, a deep trench isolation (DTI) may be formed to reduce interference between the deflected small pixlets 613-1 and 614-1 and the large pixlets 613-2 and 614-2 of the third pixels 613 and 614, between the deflected small pixlets 611-1 and 615-1 and the large pixlets 611-2 and 615-2 of the first pixel 611 and the fourth pixel 615, and between the deflected small pixlets 612-1 and 616-1 and the large pixlets 612-2 and 616-2 of the second pixel 612 and the fifth pixel 616, respectively.

As shown in FIG. 6A, although it is described that each of the first pixel 611 and the fourth pixel 615 is an "R" pixel processing a red "R" optical signal, each of the second pixel 612 and the fifth pixel 616 is a "B" pixel processing a blue "B" optical signal, and each of the two third pixels 613 and 614 is a "G" pixel processing a green "G" optical signal, the inventive concept is not confined or limited thereto. In addition, the pixels may be implemented according to various embodiments to maximize the parallax between the images for depth calculation.

In particular, as shown in FIG. 6B, while the large pixlets 613-2 and 614-2 of the two third pixels 613 and 614 are configured to process the "G" optical signals, each of the deflected small pixlets 613-1 and 614-1 of each of the two third pixels 613 and 614 may be configured to process a "W" optical signal. That is, each of the deflected small pixlets 613-1 and 614-1 of each of the third pixels 613 and 614 may be configured to process the "W" optical signal regardless of a wavelength of the optical signal processed in each of the large pixlets 613-2 and 614-2 of the third pixels 613 and 614, and therefore the parallax between the images acquired through the deflected small pixlets 613-1 and 614-1 of each of the third pixels 613 and 614 may be maximized and it may be expected that the deflected small pixlets 613-1 and 614-1 of each of the third pixels 613 and 614 operate in low luminance although areas thereof are small. Similarly, the deflected small pixlets 611-1 and 615-1 of each of the first pixel 611 and the fourth pixel 615 may be configured to process the "W" optical signal regardless of a wavelength of the optical signal processed in each of the large pixlets 611-2 and 615-2 of each of the first pixel 611 and the fourth pixel 615. In addition, the deflected small pixlets 612-1 and 616-1 of each of the second pixel 612 and the fifth pixel 616 may be configured to process the "W" optical signal regardless of a wavelength of the optical signal processed in each of the large pixlets 612-2 and 616-2 of the second pixel 612 and the fifth pixel 616.

In addition, as shown in FIG. 6C, each of the two third pixels 613 and 614 may be implemented as the "W" pixel processing the "W" optical signal, and thus all of the deflected small pixelts 613-1 and 614-1 of the two third pixels 613 and 614 and the large pixelts 613-2 and 614-2 of the two third pixels 613 and 614 may be process the "W" optical signals, respectively. Likewise in this case, the parallax between images obtained through the deflected small pixlets 613-1 and 614-1 of the third pixels 613 and 614 may be maximized, and it may be expected that the deflected small pixlets 613-1 and 614-1 of each of the third pixels 613 and 614 operate in low luminance although areas thereof are small.

Figure 7:
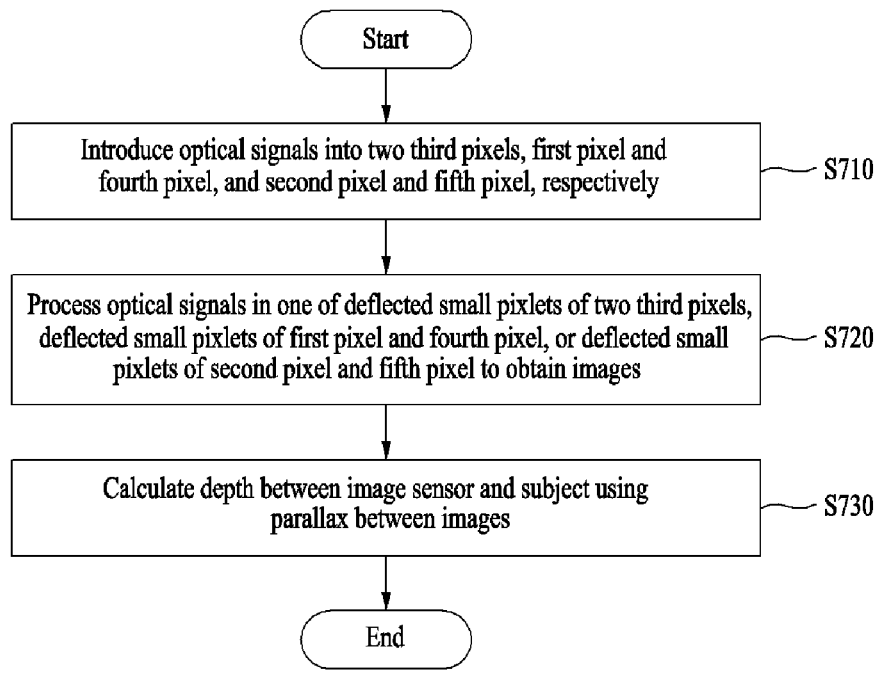
FIG. 7 is a flowchart illustrating a method of operating a camera system according to still another embodiment.

FIG. 7 is a flowchart illustrating a method of operating a camera system according to still another embodiment. The method of operating the camera system described below may be performed by the camera system including the image sensor and the depth calculator having the structure described above with reference to FIGS. 6A to 6C.

Referring to FIG. 7, the image sensor may introduce the optical signals into the two third pixels, the first pixel and the fourth pixel, and the second pixel and the fifth pixel included in one of the first 2×2 pixel block and the second 2×2 pixel block through S710, respectively. Here, the image sensor may be implemented in the structure described above with reference to FIGS. 6A to 6C (implemented in the structure in which the first 2×2 pixel block of the image sensor includes the first pixel, the second pixel, and the two third pixels, and the second 2×2 pixel block includes the fourth pixel, the fifth pixel, and the two third pixels) and include the deflected small pixlet and the large pixlet in each of the two third pixels, the deflected small pixlet and the large pixlet in each of the first pixel and the fourth pixel, and the deflected small pixlet and the large pixlet in each of the second pixel and the fifth pixel, and therefore the optical signal may be introduced into the deflected small pixlet of each of the two third pixels, the deflected small pixlet of each of the first pixel and the fourth pixel, and the deflected small pixlet of each of the second pixel and the fifth pixel in S710.

Here, the third pixels may be disposed positions diagonal to each other in the 2×2 pixel block and the deflected small pixlets of the third pixels may be disposed symmetrically to each other in the third pixels, respectively, to maximize the distance apart from each other. In particular, the offset distance of the deflected small pixlet of each of the third pixels from the pixel center of each of the third pixels to maximize the parallax between the images acquired from deflected small pixlets of the third pixels, assuming that sensitivity of sensing the optical signals in the deflected small pixlets of the third pixels is guaranteed to be greater than or equal to a predetermined level.

That is, the offset distance of the deflected small pixlet of each of the third pixels from the pixel center of each of the third pixels may be determined based on the refractive index of the microlens of each of the third pixels, the distance from the center of the image sensor to the single optical system, the distance from the microlens of each of the third pixels to the pixel center of each of the third pixels, and the diameter of the single optical system, to maximize the parallax between the images acquired from the deflected small pixlets of the third pixels, assuming that the sensitivity of sensing the optical signals in the deflected small pixlets of the third pixels is guaranteed to be greater than or equal to the predetermined level.

In addition, the first pixel and the fourth pixel may be disposed at the same position within the 2×2 pixel block, and the deflected small pixlets of the first pixel and the fourth pixel may be disposed to be symmetrical to each other within the first pixel and the fourth pixel, respectively.

Likewise, the second pixel and the fifth pixel may also be disposed at the same position within the 2×2 pixel block, and the deflected small pixlets of the second pixel and the fifth pixel may be disposed to be symmetrical to each other within the second pixel and the fifth pixel, respectively.

As examples in which the two 2×2 pixel blocks of the image sensor is implemented are varied as shown in FIGS. 6A to 6C, the wavelengths of optical signals flowing into each of the third pixels in S710 may also be varied. For example, when the third pixels are "G" pixels as shown in FIG. 6A, the optical signals flowing into the third pixels in S710 may be the "G" optical signals. As another example, when the deflected small pixlet of each of the third pixels is configured to process the "W" optical signal as shown in FIG. 6B, the optical signal flowing into the deflected small pixlet of each of the third pixels in S710 may be the "W" optical signal. In addition, when the fourth pixel and the fifth pixel are the "W" pixels as shown in FIG. 6C, the optical signals flowing into the third pixels in S710 may be the "W" optical signals.

Subsequently, the image sensor processes the optical signal in one of the deflected small pixlets of the third pixels, the deflected small pixlets of the first pixel and the fourth pixel, or the deflected small pixlets of the second pixel and the fifth pixel, which are included in the first 2×2 pixel block or the second 2×2 pixel block, to obtain images through S720.

In particular, in S720, the image sensor may selectively drive one of the deflected small pixlets of the third pixels, the deflected small pixlets of the first pixel and the fourth pixel, or the deflected small pixlets of the second pixel and the fifth pixel, included in the first 2×2 pixel block or the second 2×2 pixel block, which is less affected by environmental factors, and process the optical signal, thereby improving accuracy of the depth calculation to be described.

Thereafter, the depth calculator calculates the depth between the image sensor and the object using the parallax between the images input from the image sensor through S730.

In S720 and S730, the camera system may form a plurality of pairs of deflected small pixlets for calculating the depth within the two 2×2 pixel blocks and selectively use some pairs of the plurality of pairs of deflected small pixlets (selectively use one pair of a pair of the deflected small pixlets of the third pixels, a pair of the deflected small pixlets of the first pixel and the fourth pixel, or a pair of the deflected small pixlets of the second pixel and the fifth pixel included, in one of the first 2×2 pixel block and the second 2×2 pixel block), thereby improving the accuracy of the depth calculation.

In addition, although not shown in the drawings, the image sensor may regularly use the pixels for generating the color image in addition to the pixels for the depth calculation, to generate the color image securing excellent color restoration and SNR. For example, the image sensor may merge the images acquired from the large pixlets of the third pixels, the images acquired from the large pixlets of the first pixel and the fourth pixel, and the images acquired from the large pixlets of the second pixel and the fifth pixel, which are included in the two 2×2 pixel blocks, to form the color image, thereby securing the excellent color restoration and SNR.

Embodiments may provide the image sensor to which the complementary pixlet structure, in which the two pixlets are implemented in the one pixel, is applied to enable estimation of the depth to the object in the single camera system.

According to an aspect, embodiments may provide the structure in which the deflected small pixlets of the pixels included in the one 2×2 pixel block to calculate the depth between the image sensor and the object using the parallax between the images acquired through the deflected small pixlets of the pixels in the one 2×2 pixel block.

According to another aspect, embodiments may provide the structure in which the two 2×2 pixel blocks include the pixels in which the deflected small pixlets are formed to calculate the depth between the image sensor and the object using the parallax between the images acquired through the deflected small pixlets of the pixels in the two 2×2 pixel blocks.

According to still another aspect, embodiments may provide the structure in which the deflected small pixlet is formed in each of the first pixels included in the one 2×2 pixel block and the each second pixel with the deflected small pixlet is included in each of the second pixels of the two 2×2 pixel blocks, to calculate the depth between the image sensor and the object using the parallax between the images acquired through the deflected small pixlets of the first pixels in the one 2×2 pixel block or the parallax between the images acquired through the deflected small pixlets of the second pixels in the two 2×2 pixel blocks.

Embodiments provide the camera system regularly using the pixlets for calculating the depth within the two pixels to simplify the depth calculating algorithm and reduce work complexity, to reduce depth calculation time consumption and secure real-time, to simplify circuit configuration, and to ensure consistent depth resolution.

Here, embodiments provide the camera system configured to process the white "W" optical signals in the deflected small pixlets for the depth calculation, thereby maximizing the parallax between the images obtained from the deflected small pixlets.

In addition, embodiments provide the camera system in which the 2×2 pixel block is configured to include the red "R" pixel, the yellow "Y" pixel, and the white "W" pixel or the green "G" pixel, the "Y" pixel, and the "W" pixel, thereby securing color restoration and signal-to-noise ratio (SNR).

While this disclosure includes specific example embodiments and drawings, it will be apparent to one of ordinary skill in the art that various alterations and modifications in form and details may be made in these example embodiments. For example, suitable results may be achieved if the described techniques are performed in a different order, and/or if components in a described system, architecture, device, or circuit are combined in a different manner, and/or replaced or supplemented by other components or equivalents thereof.

Accordingly, other implementations, other embodiments, and equivalents of claims are within the scope of the following claims.

What is claimed is:

1. A camera system with a complementary pixlet structure, the camera system comprising:
   an image sensor configured to include at least one 2×2 pixel block including a first pixel, a second pixel, and two third pixels—the two third pixels are disposed at positions diagonal to each other in the 2×2 pixel block and include deflected small pixlets, which are deflected in opposite directions to be symmetrical to each other with respect to each pixel center, and large pixlets adjacent to the deflected small pixlets, respectively, and each pixlet includes a photodiode converting an optical signal to an electrical signal; and
   a depth calculator configured to receive images acquired from the deflected small pixlets of the two third pixels and calculate a depth between the image sensor and an object using a parallax between the images,
   wherein, when the first pixel is an "R" pixel, the second pixel is a "Y" pixel, and each of the two third pixels is a "W" pixel,
   the image sensor:
      uses the optical signal of a wavelength processed in the first pixel and the optical signal of a wavelength processed in the second pixel to generate an image based on a "G" optical signal, and
      uses the optical signals of wavelengths processed in the two third pixels and the optical signal of the wavelength processed in the second pixel to generate an image based on a "B" optical signal,
   wherein the "R" pixel is processing a red optical signal, wherein the "Y" pixel is processing a yellow optical signal, wherein the "W" pixel is processing a white optical signal, wherein the "G" optical signal is a green optical signal, and wherein the "B" optical signal is a blue optical signal.

2. The camera system of claim 1, wherein the deflected small pixlets of the two third pixels are disposed to maximize a distance apart from each other, within the two third pixels, respectively.

3. The camera system of claim 2, wherein the deflected small pixlet of one of the two third pixels is a left-deflected small pixlet deflected in a left direction with respect to the pixel center of the one third pixel, and
   wherein the deflected small pixlet of the other third pixel is a right-deflected small pixlet deflected in a right direction with respect to the pixel center of the other third pixel.

4. The camera system of claim 1, wherein each of the two third pixels is one of a "W" pixel processing a white "W" optical signal or a "G" pixel processing a green "G" optical signal.

5. A camera system with a complementary pixlet structure, the camera system comprising:
   an image sensor configured to include at least one 2×2 pixel block including a first pixel, a second pixel, and two third pixels—the two third pixels are disposed at positions diagonal to each other in the 2×2 pixel block and include deflected small pixlets, which are deflected in opposite directions to be symmetrical to each other with respect to each pixel center, and large pixlets adjacent to the deflected small pixlets, respectively, and each pixlet includes a photodiode converting an optical signal to an electrical signal; and a depth calculator configured to receive images acquired from the deflected small pixlets of the two third pixels and calculate a depth between the image sensor and an object using a parallax between the images, wherein each of the deflected small pixlets of each of the two third pixels processes a "W" optical signal having a wavelength different from a "G" optical signal processed by each of the large pixlets of each of the two third pixels, wherein the "W" optical signal is a white optical signal, and wherein the "G" optical signal is a green optical signal.

6. A camera system with a complementary pixlet structure, the camera system comprising:

an image sensor configured to include at least one 2×2 pixel block including a first pixel, a second pixel, and two third pixels—the two third pixels are disposed at positions diagonal to each other in the 2×2 pixel block and include deflected small pixlets, which are deflected in opposite directions to be symmetrical to each other with respect to each pixel center, and large pixlets adjacent to the deflected small pixlets, respectively, and each pixlet includes an photodiode converting an optical signal to an electrical signal; and a depth calculator configured to receive images acquired from the deflected small pixlets of the two third pixels and calculate a depth between the image sensor and an object using a parallax between the images, wherein, when the first pixel is a "G" pixel, the second pixel is a "Y" pixel, and each of the two third pixels is a "W" pixel, the image sensor:
uses the optical signal of a wavelength processed in the first pixel and the optical signal of a wavelength processed in the second pixel to generate an image based on an "R" optical signal, and uses the optical signals of wavelengths processed in the two third pixels and the optical signal of the wavelength processed in the second pixel to generate an image based on a "B" optical signal, wherein the "G" pixel is processing a green optical signal, wherein the "Y" pixel is processing a yellow optical signal, wherein the "W" pixel is processing a white optical signal, wherein the "R" optical signal is a red optical signal, and wherein the "B" optical signal is a blue optical signal.

* * * * *